United States Patent
Johnson

(10) Patent No.: US 9,426,638 B1
(45) Date of Patent: Aug. 23, 2016

(54) SYSTEM AND METHOD FOR SIGNALING AND RESPONDING TO AN EMERGENCY SITUATION

(71) Applicant: TapShield, LLC, Orlando, FL (US)

(72) Inventor: Jordan Johnson, Orlando, FL (US)

(73) Assignee: Tapshield Protection, LLC, Clearwater, FL (US)

( * ) Notice: Subject to any disclaimer, the term of this patent is extended or adjusted under 35 U.S.C. 154(b) by 67 days.

(21) Appl. No.: 14/247,734

(22) Filed: Apr. 8, 2014

Related U.S. Application Data

(60) Provisional application No. 61/823,060, filed on May 14, 2013, provisional application No. 60/914,170, filed on Dec. 10, 2013.

(51) Int. Cl.
*H04W 4/22* (2009.01)
*H04W 76/00* (2009.01)
*G08B 25/01* (2006.01)

(52) U.S. Cl.
CPC ............... *H04W 4/22* (2013.01); *G08B 25/016* (2013.01); *H04W 76/007* (2013.01); *H04M 2242/04* (2013.01)

(58) Field of Classification Search
CPC . H04W 4/22; H04W 76/007; H04M 2242/04; G08B 25/016
USPC ...................................................... 455/404.1
See application file for complete search history.

(56) References Cited

U.S. PATENT DOCUMENTS 6,882,334 B1  4/2005  Meyer
8,351,916 B2  1/2013  Fan et al.
8,559,914 B2  10/2013  Jones
8,565,717 B2  10/2013  Galuszka
8,768,294 B2  7/2014  Reitnour et al.
(Continued)

FOREIGN PATENT DOCUMENTS

CN  102915607 A  *  2/2013  .............. G08B 13/14
DE  EP 1251472 A1  *  10/2002  ......... G08B 13/1427
(Continued)

OTHER PUBLICATIONS

Jeff Dengate, Caitlin Giddings, Danielle Whitis; "27 Apps Every Runner Should Know About"; http://www.runnersworld.com/electronics; Nov. 18, 2015.
(Continued)

*Primary Examiner* — Raymond Dean
(74) *Attorney, Agent, or Firm* — GrayRobinson, P.A.

(57) ABSTRACT

Disclosed is a system and method for signaling the presence of an emergency situation. The system includes a personal emergency device in communication with a dispatch station over a wireless network. Upon encountering an emergency situation, a user signals an alert using the personal emergency device, which includes a mobile device running custom security software. The device subsequently transmits information about the users location and personal characteristics to the dispatch station, where it is interpreted by a computer running custom emergency alert monitoring and reporting software, enabling a dispatcher to notify emergency service personnel about the location and characteristics of the user in an emergency situation. The system further enables a user to communicate with emergency personnel and other predetermined third parties in real time during the emergency situation.

26 Claims, 23 Drawing Sheets

(56) References Cited

U.S. PATENT DOCUMENTS

| | | |
|---|---|---|
| 8,862,092 B2 | 10/2014 | Reitnour |
| 8,929,853 B2 | 1/2015 | Butler |
| 2009/0289763 A1 | 11/2009 | Chriss et al. |
| 2010/0330952 A1 | 12/2010 | Yeoman |
| 2013/0065569 A1 | 3/2013 | Leipzig et al. |
| 2013/0078954 A1 | 3/2013 | Fan et al. |
| 2013/0169434 A1 | 7/2013 | McCown et al. |
| 2014/0066000 A1 | 3/2014 | Butler |

FOREIGN PATENT DOCUMENTS

| | | |
|---|---|---|
| DE | 202013000840 U1 | 3/2013 |
| JP | H11283160 A | 10/1999 |

OTHER PUBLICATIONS

Natalie Matthews; "This New App Could've Prevented My Friend's Rape"; www.elle.com/culture/tech/a10/kitestring-app-safety-apps-women/; Apr. 17, 2014.

Mike Campbell; http://applesinsider.com/articles/14/03/06/apples-attack-detection-mode-protects-iphone-owners-in-emergency-situation; Mar. 6, 2014.

http://guardly.com; access date Mar. 31, 2016.

Jeff Dengate; Caitlin Giddings; Danielle Whitis; "27 Apps Every Runner Should Know About"; Nov. 18, 2015; www.runnersworld.com/electronics.

\* cited by examiner

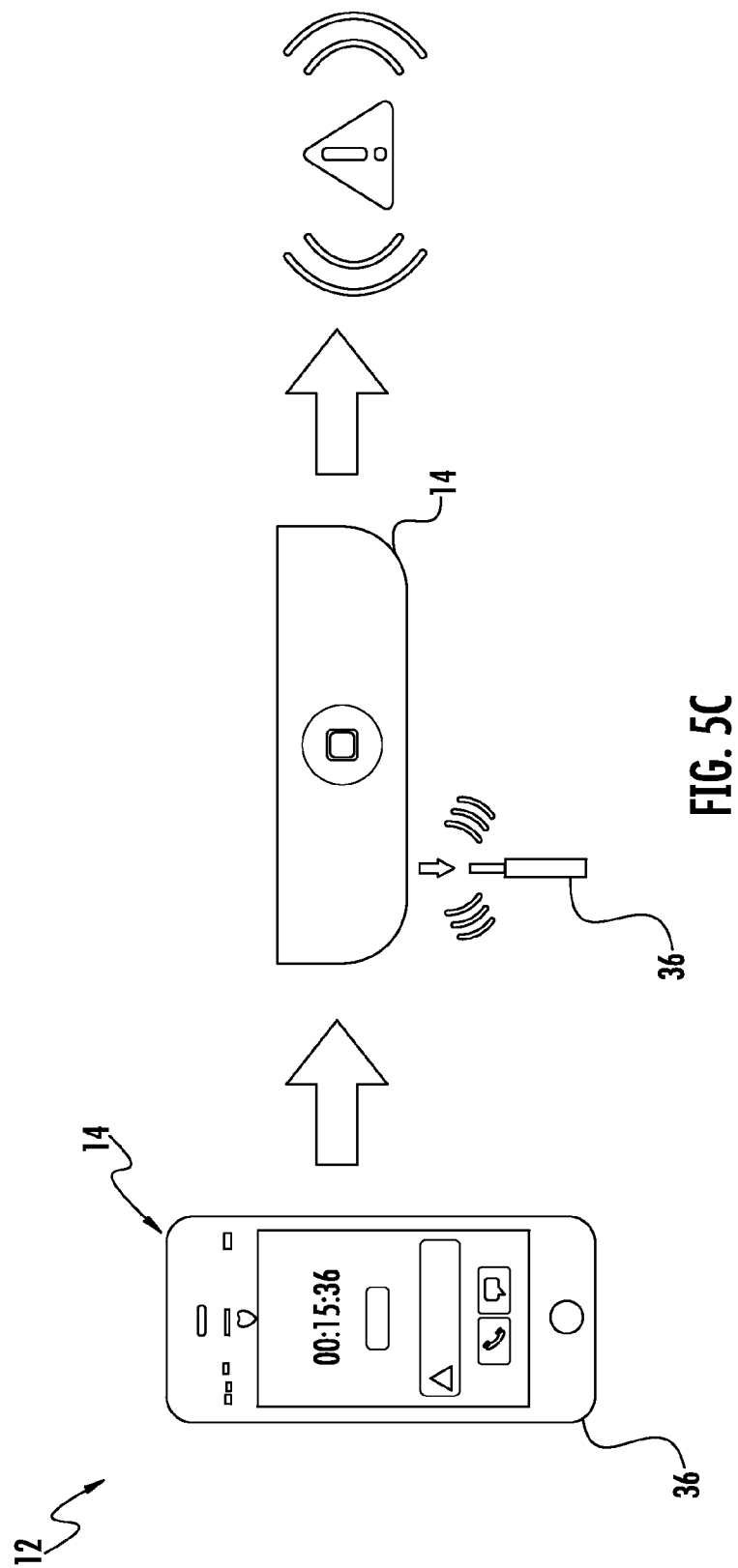

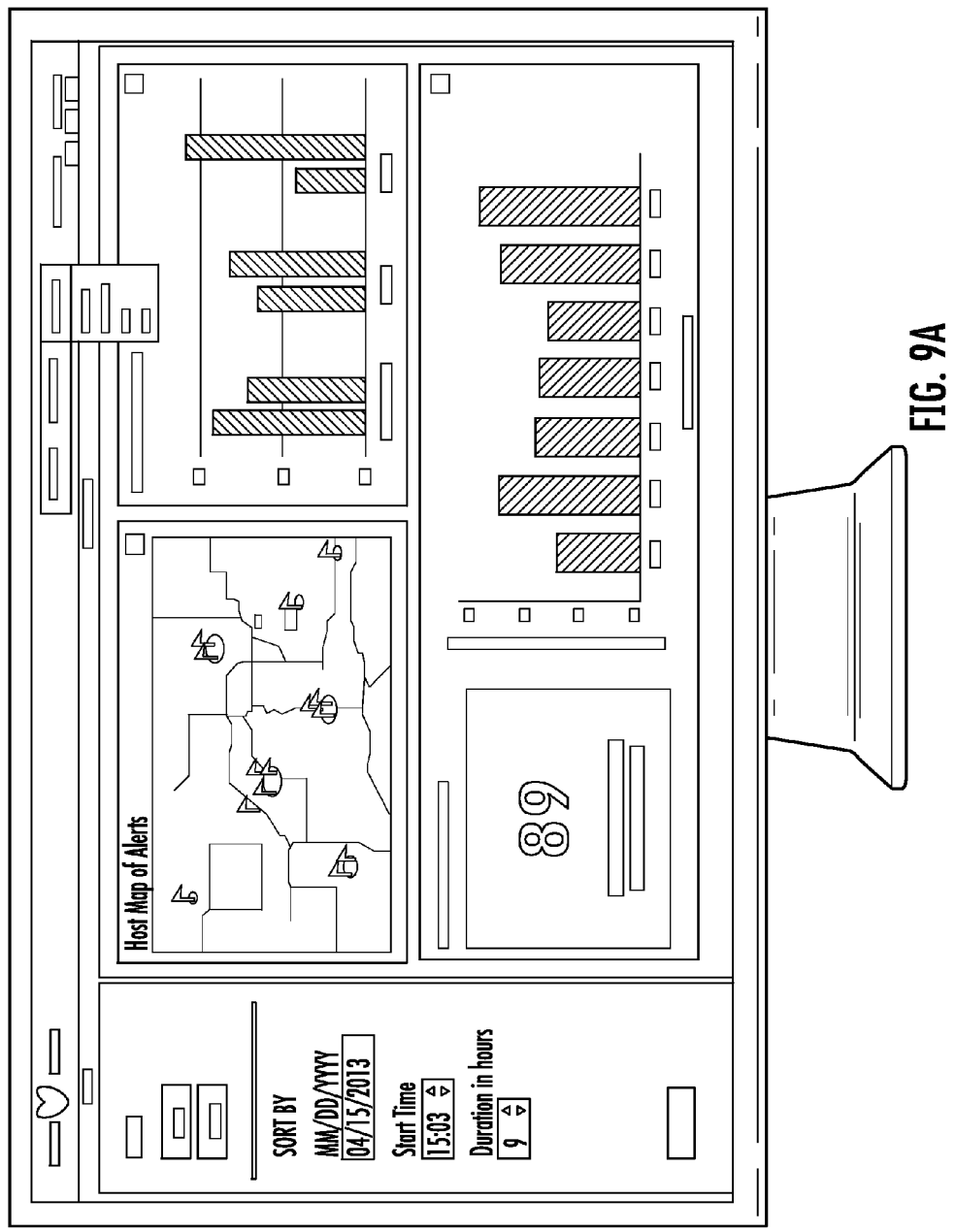

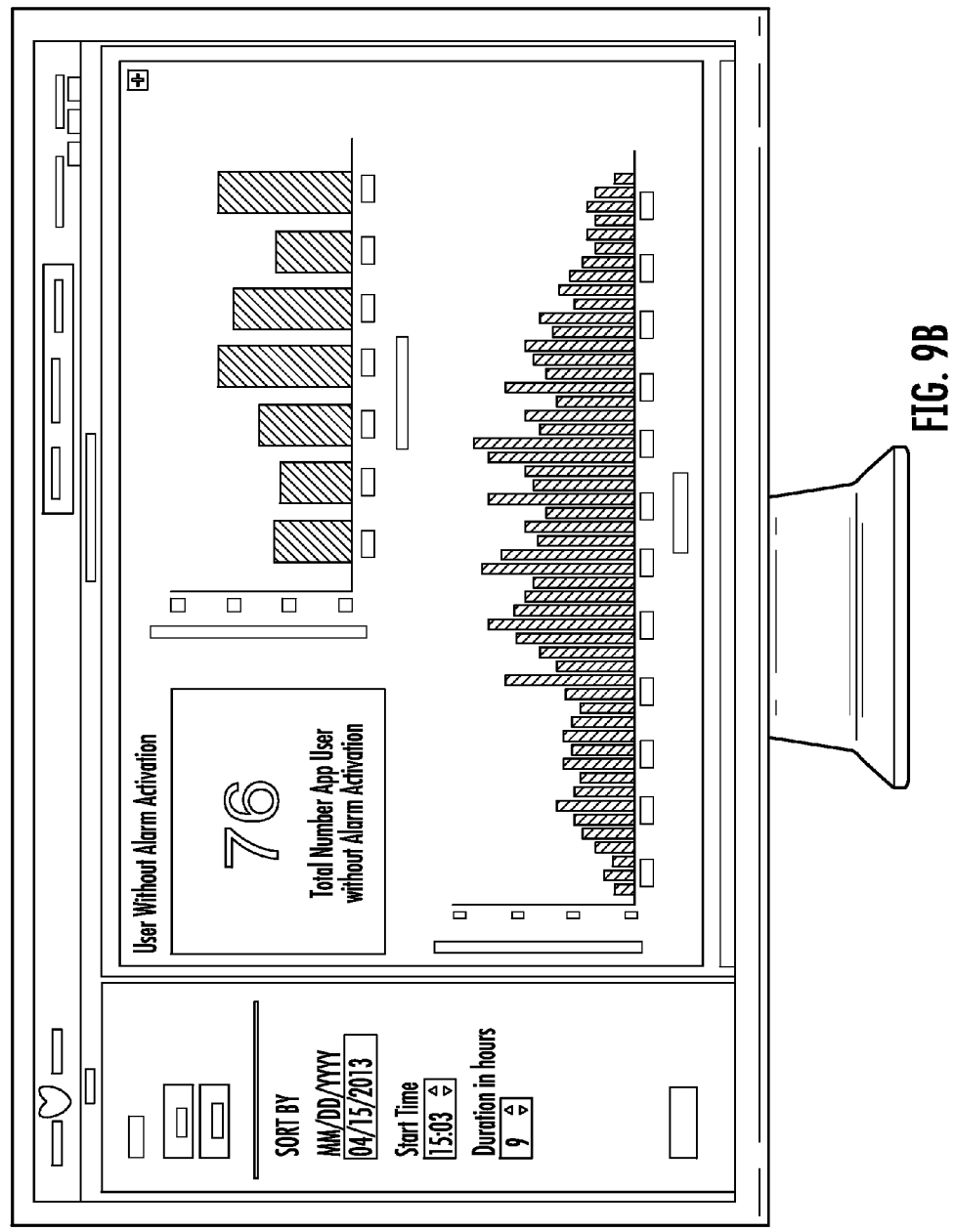

FIG. 9C

SYSTEM AND METHOD FOR SIGNALING AND RESPONDING TO AN EMERGENCY SITUATION

RELATED APPLICATION DATA

This application is related to and claims priority to Provisional Application Ser. No. 61/823,060 filed on May 14, 2013 entitled "System and Method for Detection of Hardware Disconnection as an Aid in Security Software" and Provisional Application Ser. No. 61/914,170 filed on Dec. 10, 2013 entitled "System and Method for Signaling and Responding to an Emergency Situation." The content of these applications is fully incorporated by reference herein for all purposes.

TECHNICAL FIELD

This disclosure relates to a system and method for initiating an emergency response. More particularly, this disclosure relates to a system and method for rapidly signaling an alert upon encountering an emergency situation and initiating a response to the emergency situation.

BACKGROUND OF THE INVENTION

Emergency alert monitoring systems are known in the art. However, existing systems suffer from several limitations. For example, traditional means of summoning help with a mobile device in an emergency often require a user to dial an emergency number, such as 911, and convey to an operator or emergency dispatcher the nature and location of the emergency by speaking. With many modern smart phones, dialing an emergency number can also require a user to tap several icons, sometimes up to ten or more, on a screen before actually dialing an emergency number. Thus, a need exists in the art that simplifies a user's ability to summon help in an emergency that is fast, discrete, and allows emergency dispatchers and response personnel to rapidly determine the location of a user in distress and respond accordingly. Further, a need exists for a system that enables a user to communicate with emergency dispatch personnel and other predetermined third parties during an emergency.

SUMMARY

Embodiments described herein relate to a system and method for alerting others to the occurrence of an emergency situation, and further provide the ability for a user to communicate with emergency personnel and other predetermined third parties during the emergency situation. The system may include a personal emergency device, such as a mobile device running custom security software, and a dispatch station including a computer running custom emergency alert monitoring and reporting software. In another embodiment, the system may include a personal emergency device, such as a mobile device running custom security software, and a dispatch station including a cloud-based incident response platform that can instantly transmit an individual's real-time GPS location and profile information in the event of an emergency. The various components of embodiments, and the manner in which they interrelate, are described in greater detail hereinafter.

The system and method disclosed have several important advantages. For example, the system provides a fast, easy, and reliable method for a user in distress to summon help in an emergency situation and communicate with emergency dispatch personnel and other third parties during an emergency.

Another advantage includes providing an integrated system for alerting an emergency dispatcher to the presence and location of an emergency situation.

Yet another advantage includes notifying an emergency dispatcher of the qualitative characteristics of a user in distress.

Still yet another advantage includes notifying a preselected and/or particularly qualified group of people about the occurrence and location of a user's emergency situation.

Another advantage includes providing a system and method for silently and discretely communicating with emergency dispatchers, a personal network, or other emergency personnel in the event of a user encountering an emergency situation.

Even yet another advantage includes notifying users of locations and areas in which emergency situations most often occur.

Another advantage includes decreasing the time required for emergency response personnel to respond to an emergency.

Even yet another advantage includes tracking emergencies relating to students on a campus or corporate executives and employees.

Still yet another advantage includes providing a system and method for signaling an emergency situation when a user fails to arrive at a predetermined destination within a preset timeframe.

BRIEF DESCRIPTION OF THE DRAWINGS

For a more complete understanding of the present disclosure and its advantages, reference is now made to the following descriptions, taken in conjunction with the accompanying drawings, in which:

FIG. 5C is a depiction of a peripheral device disconnection emergency signaling feature, including a personal emergency device and associated peripheral device;

FIG. 9A is another depiction of a dispatch station including a computer running custom emergency alert monitoring and reporting software displaying analytics relating to emergency alerts;

FIG. 9B is another depiction of a dispatch station including a computer running custom emergency alert monitoring and reporting software displaying analytics relating to emergency alerts;

FIG. 9C is yet another depiction of a dispatch station including a computer running custom emergency alert monitoring and reporting software displaying personal information about a user;

Similar reference numerals refer to similar parts throughout the several views of the drawings.

DETAILED DESCRIPTION OF EMBODIMENTS

Figure 1:
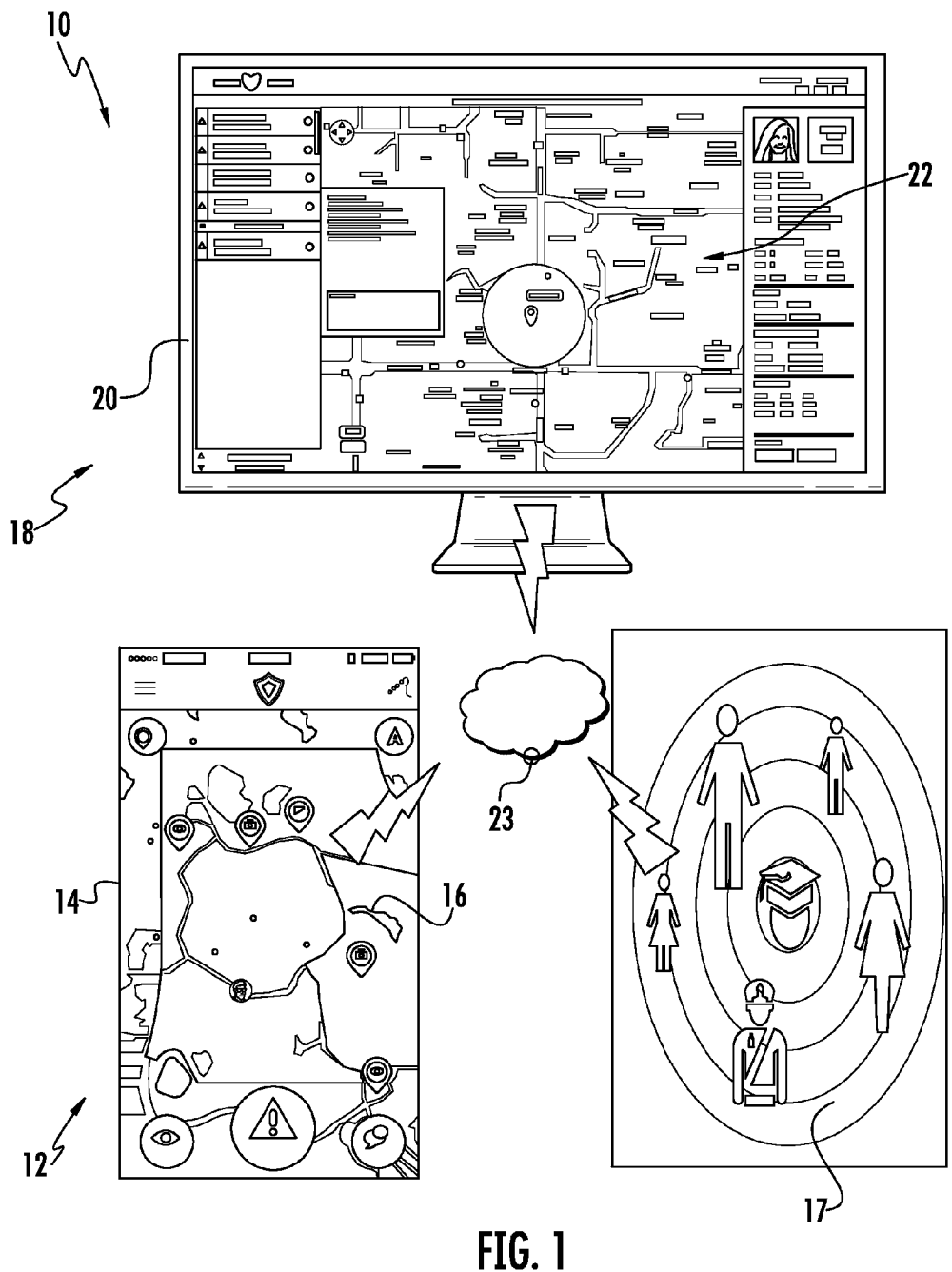
FIG. 1 is a graphical depiction of one system, including the personal emergency device, the computer running custom emergency alert monitoring and reporting software, and third parties, including a personal network, such as a social safety network, and emergency response personnel.

Initially with reference to FIG. 1, one system 10 comprises a personal emergency device 12 including a mobile device 14 running custom security software 16, and a dispatch station 18 including a computer 20 running custom emergency alert monitoring software and reporting software 22. In one embodiment, the mobile device 14 is a smartphone capable of communicating over a cellular, Wi-Fi, or other wireless network 23.

Figure 2A:
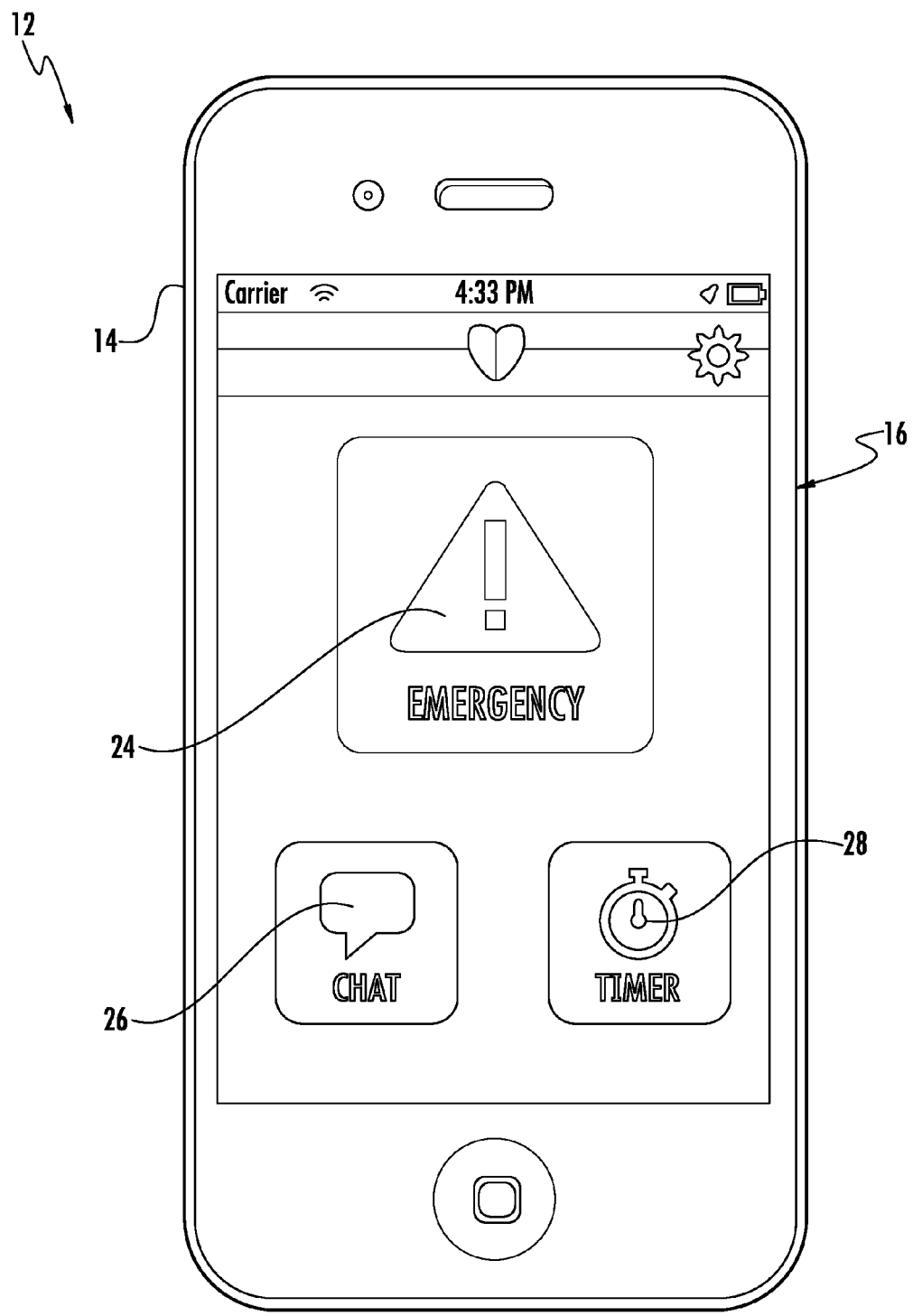
FIG. 2A is a depiction of a personal emergency device displaying three modes.
Figure 2B:
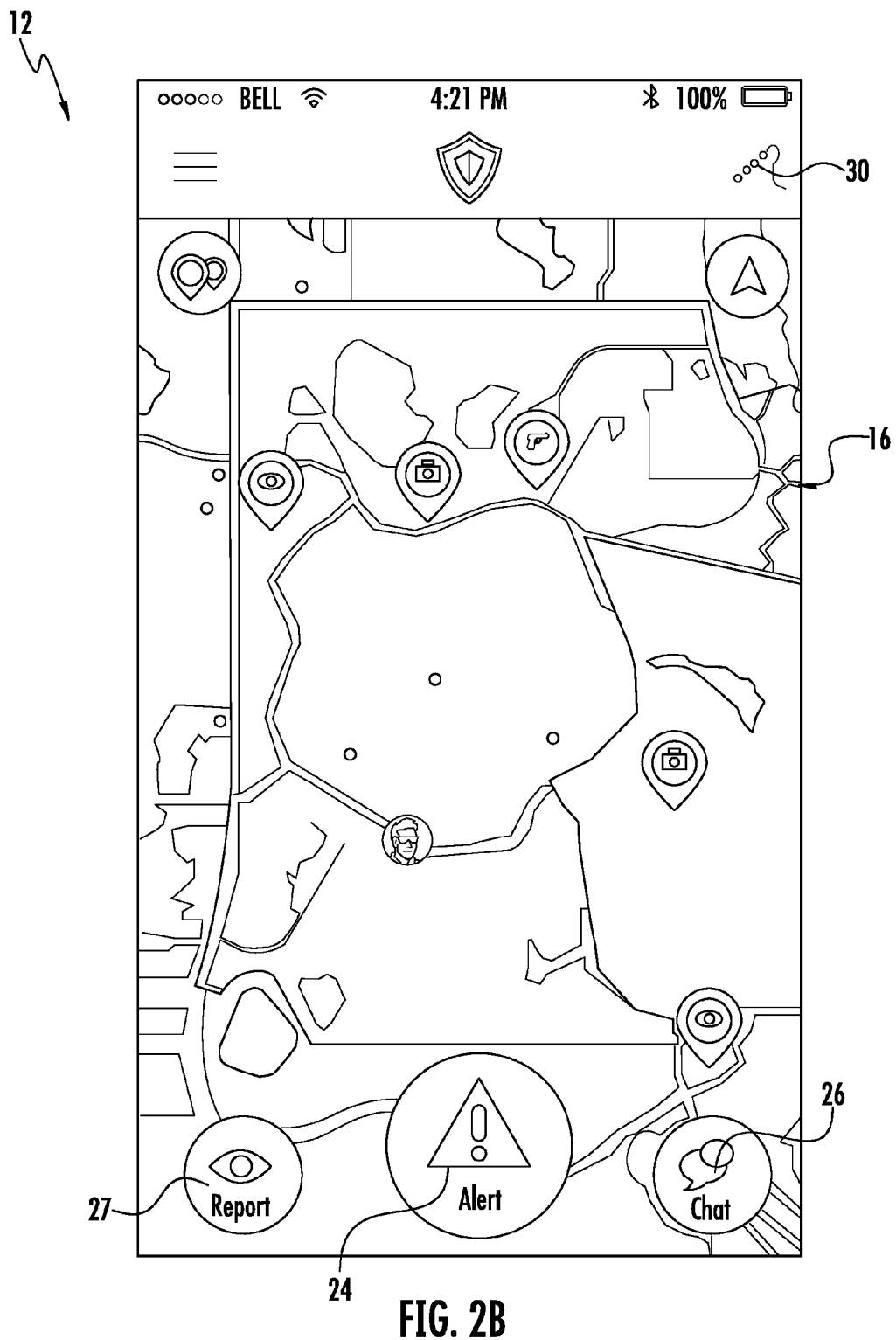
FIG. 2B is another depiction of a personal emergency device of the present disclosure displaying information relating to the location of an incident and an additional crime reporting mode.
Figure 2C:
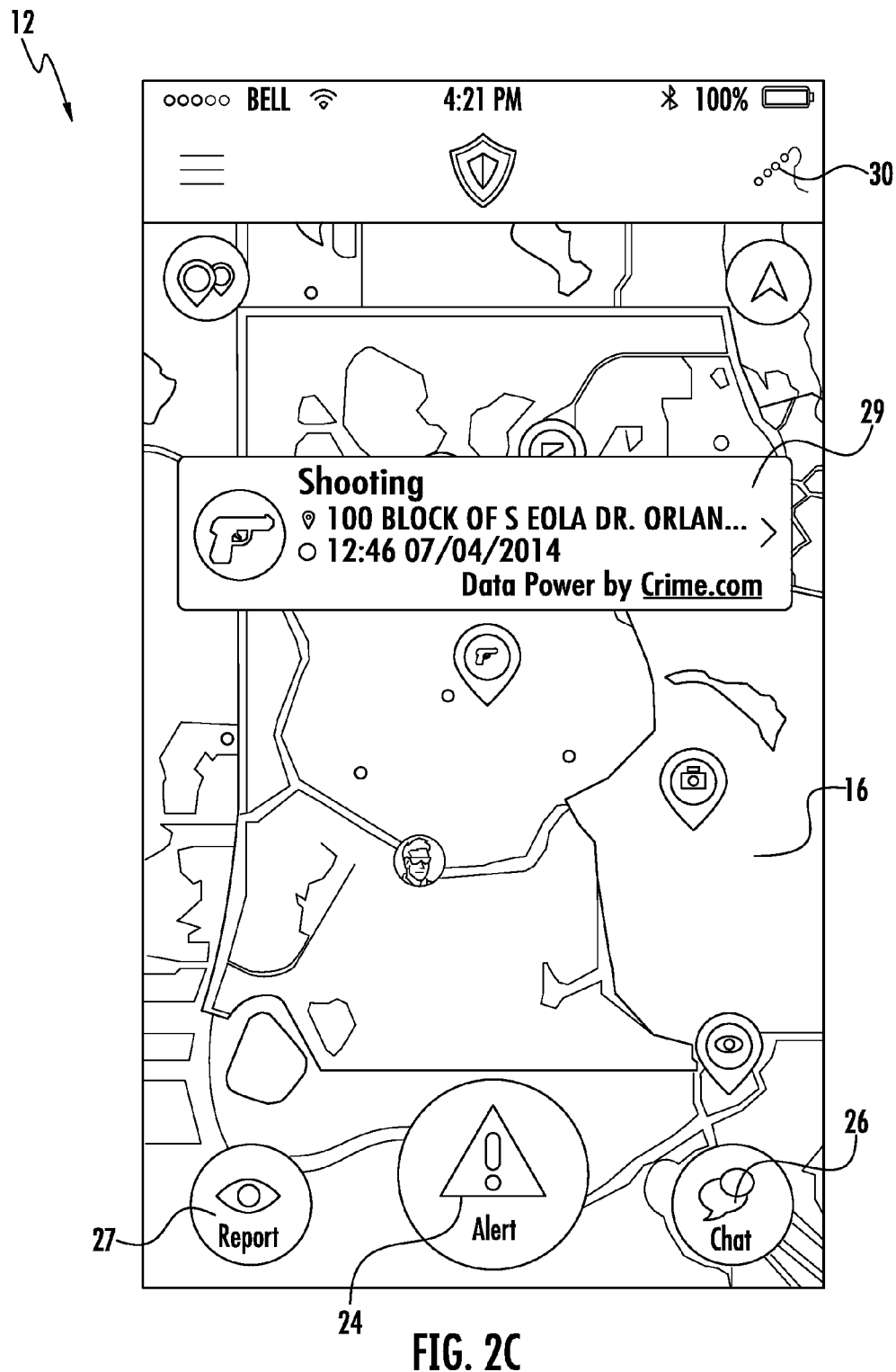
FIG. 2C is a depiction of a personal emergency device displaying information relating to a crime.

The custom security software 16 includes at least one mode for signaling an emergency situation by initiating an alarm or emergency alert. In the embodiment depicted in FIG. 2A, the custom security software 16 comprises three modes for signaling an alert, including an emergency mode 24, a chat mode 26, and a timer mode 28. Another embodiment includes four modes for signaling an alert, including an emergency mode 24, a chat mode 26, a timer mode 28, and a yank mode 30 substantially as described below. In an alternative embodiment depicted in FIG. 2B, the custom security software 16 includes an emergency mode 24, a chat mode 26, a real-time crime reporting mode 27, and a peripheral detection service, or yank, mode 30. FIG. 2C depicts yet another embodiment in which the custom security software 16 displays information relating to a crime 29 in a user's vicinity.

Figure 3A:
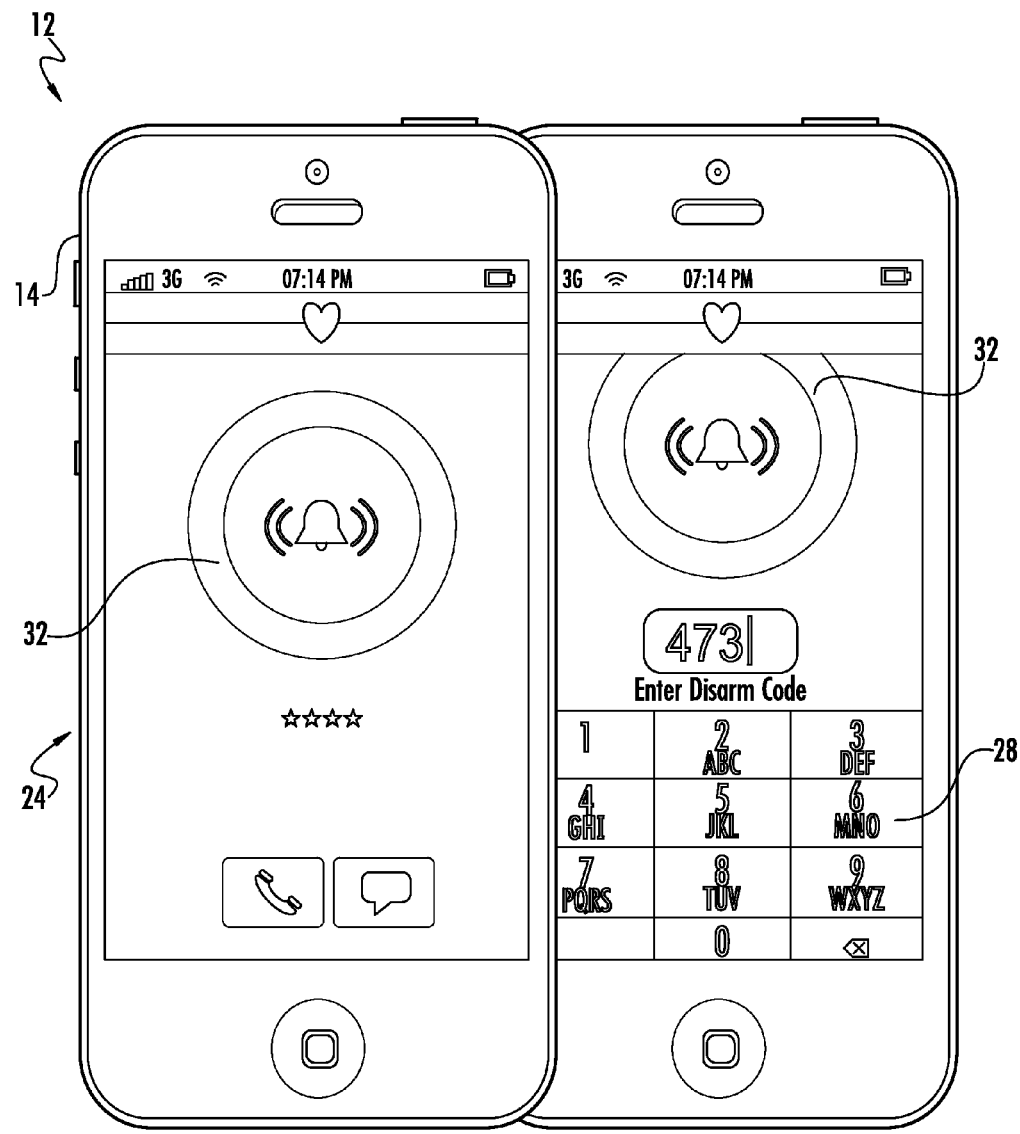
FIG. 3A is a depiction of a personal emergency device in emergency mode after an alarm has been triggered.
Figure 3B:
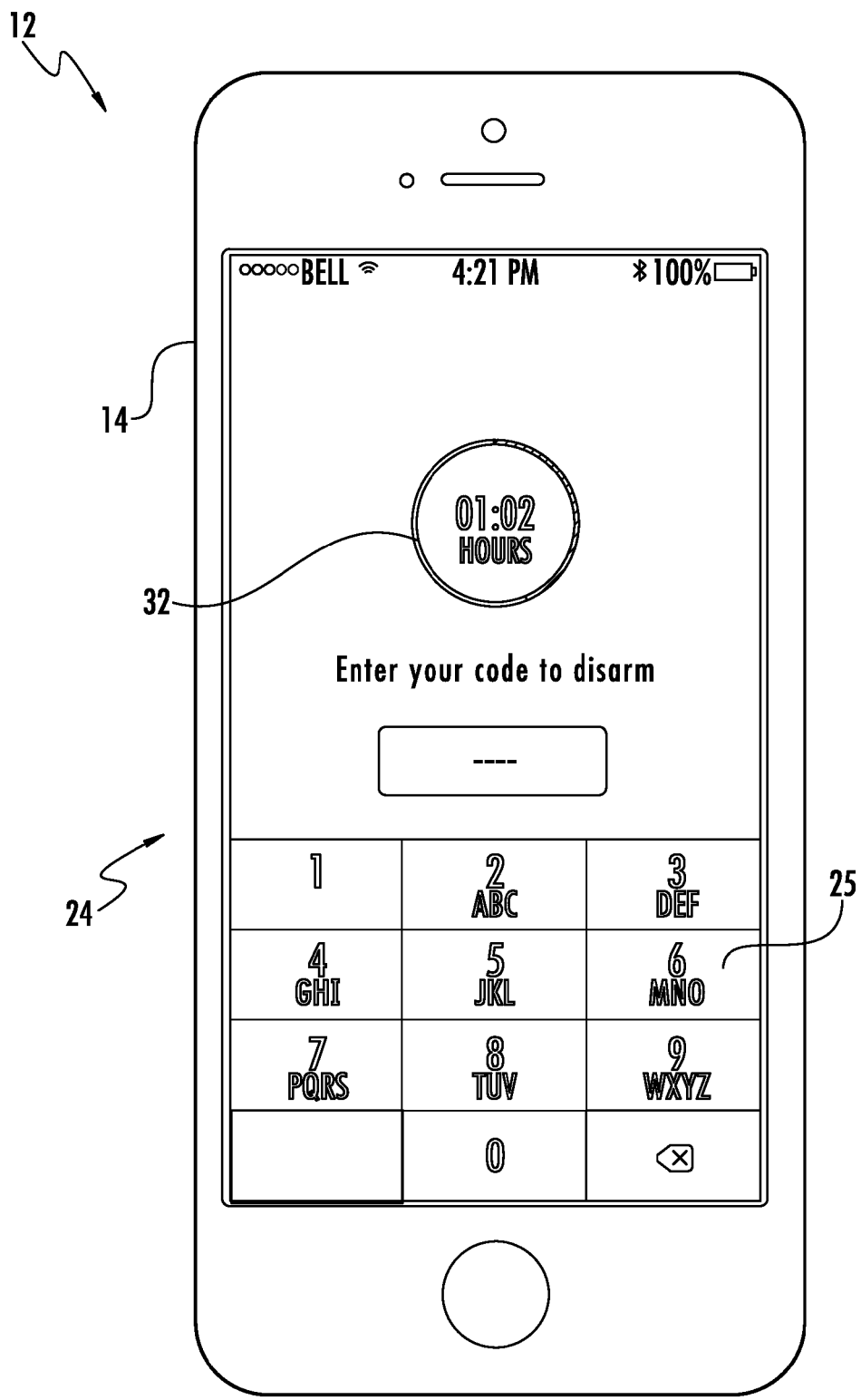
FIG. 3B is another depiction of a personal emergency device after an alarm has been triggered.

Referring now to FIG. 3A, an embodiment of the emergency mode 24 enables a user to signal an emergency by tapping an icon on a touchscreen or a button. Once a user signals an emergency, a countdown delay timer 32 is initiated for a predetermined period of time, providing sufficient time for the user to cancel the alarm prior to signaling the emergency to third parties. In one embodiment, the delay is about 15 seconds but can vary. To cancel the alarm prior to third party notification, the user may enter a predetermined personal identification number (PIN) or password, or other identifying characteristic using a touchscreen or physical keypad 25. If the user fails to cancel (i.e. disarm) the alarm, third parties or other emergency response personnel are notified of the emergency substantially as described below. FIG. 3B depicts an alternative embodiment of a personal emergency device in which an alarm has been triggered, thereby beginning a countdown delay timer 32 and providing an opportunity to cancel or disarm the alarm by entering a password, PIN, or the like in a touchscreen keypad.

Figure 4:
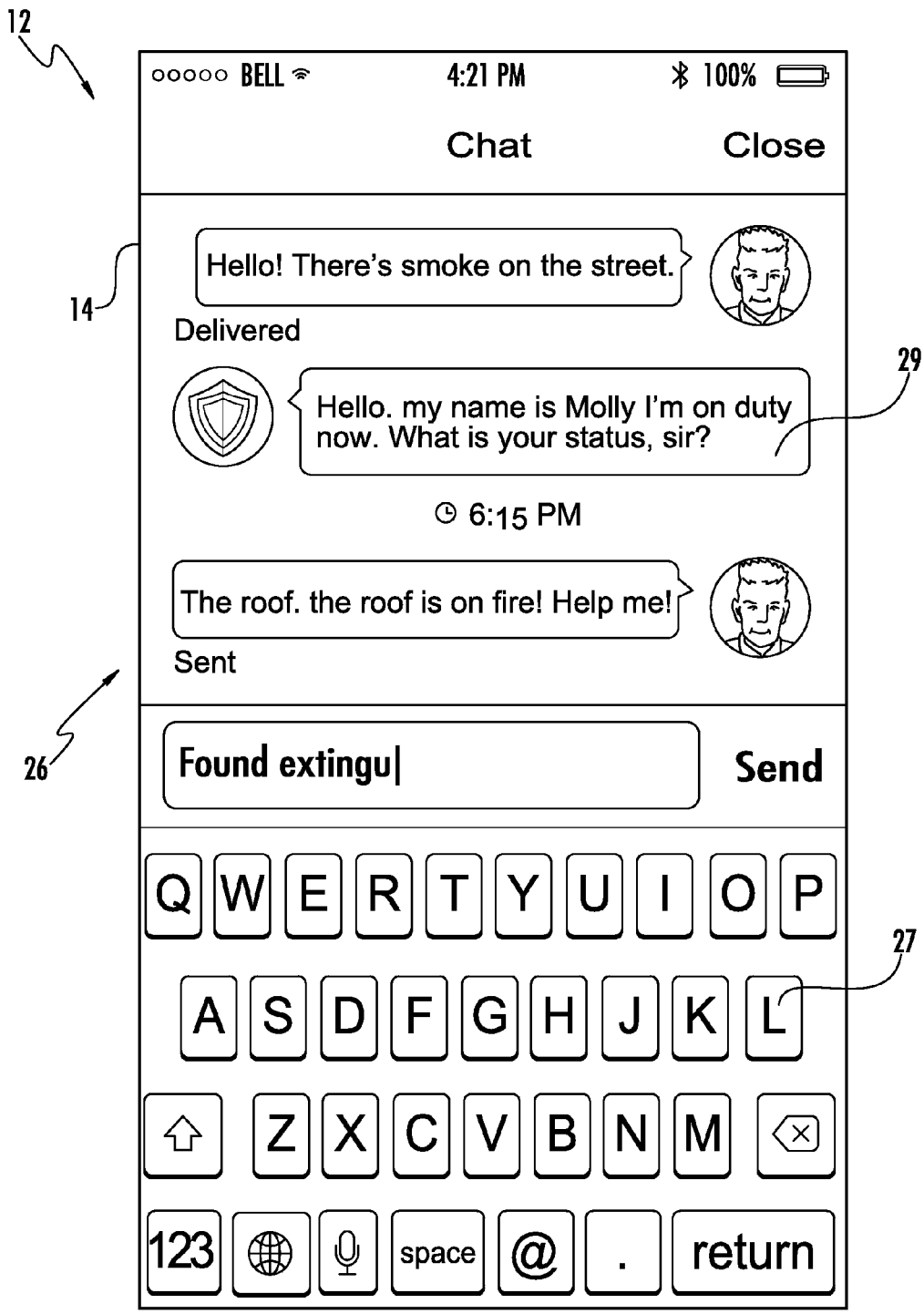
FIG. 4 is a depiction of a personal emergency device in chat mode.

With reference now to FIG. 4, an embodiment of the chat mode 26 enables a user to quietly and discretely communicate with emergency dispatchers or personnel to signal an emergency situation by entering a message 29 into the security software in the form of at least one of text, images, video, or sound and sending the message to third parties without notifying others in the vicinity. Once an emergency situation is encountered, the user initiates the chat mode 26 by tapping an icon on a touchscreen or a button, thereby opening a two-way chat dialog box between the user and at least one predetermined third party. For example, in one embodiment, the at least one predetermined third party may comprise the police, security personnel, or other authority monitoring the system for the occurrence of an emergency alert. In the embodiment depicted in FIG. 4, the user may then inform emergency response personnel or other third parties of the nature and circumstances of the emergency situation by entering information into a physical or touchscreen alphanumeric keypad 27.

Figure 5A:
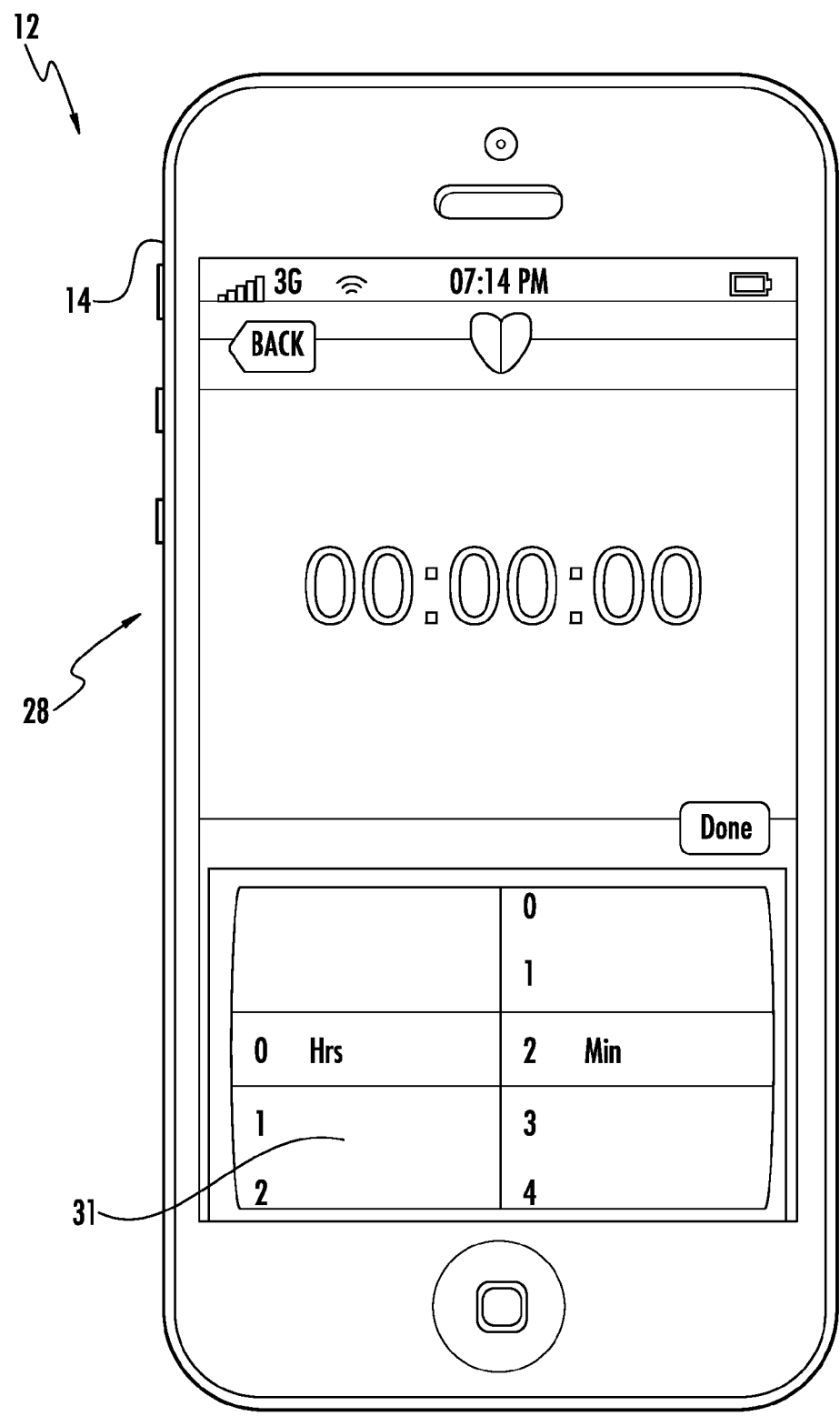
FIG. 5A is a depiction of a personal emergency device in timer mode.
Figure 5B:
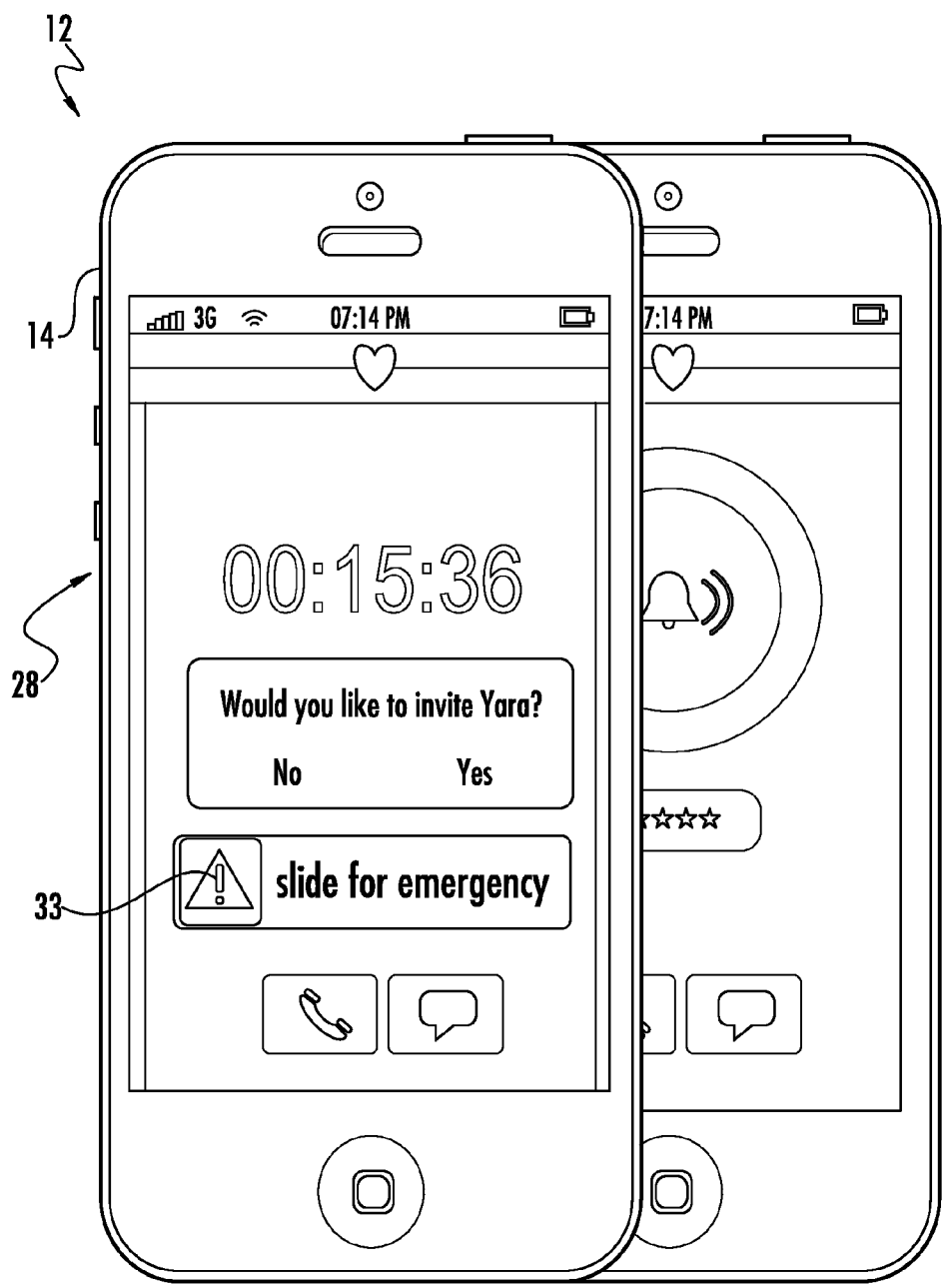
FIG. 5B is another depiction of a personal emergency device in timer mode.

The embodiment of the timer mode 28 depicted in FIGS. 5A-5B enables a user to use a timer to set a predetermined time delay 31 before an emergency alert is automatically sent to third parties. The user may cancel the timer prior to completion of the predetermined time by entering a PIN or password. If the timer is not canceled prior to the passing of the predetermined time, an emergency alert is sent to third parties, including but not limited to emergency personnel and predetermined contacts. The timer mode further comprises an icon or button 33 for initiating an emergency alert by pressing or sliding prior to the expiration of the predetermined time. The timer mode 28 may also include an icon or button for initiating at least one of a phone call or chat dialog box for communicating directly with emergency service personnel.

Figure 5D:
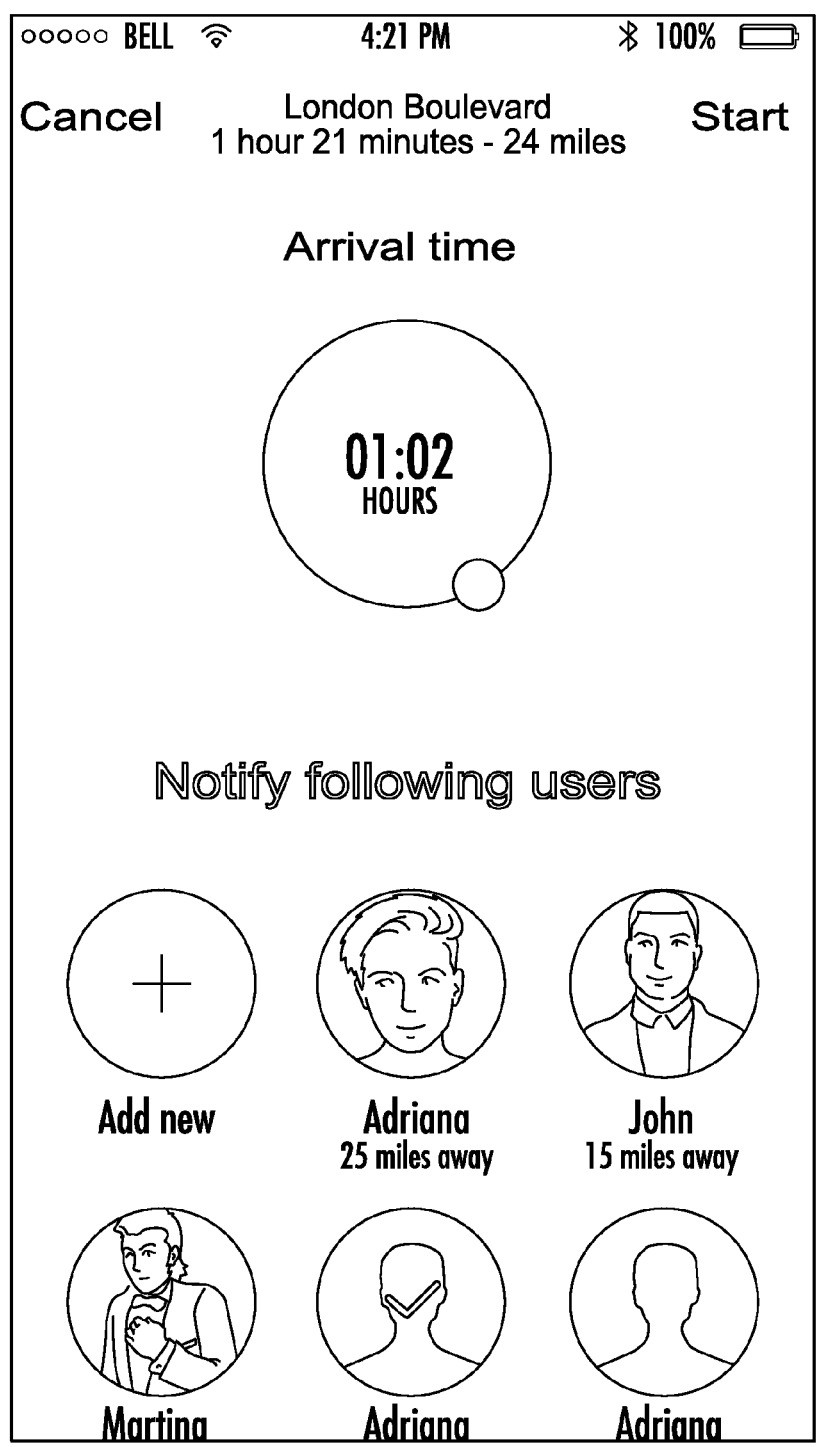
FIG. 5D is another depiction of a personal emergency device in timer mode, including a selection of individuals to be notified upon expiration of the timer.
Figure 5E:
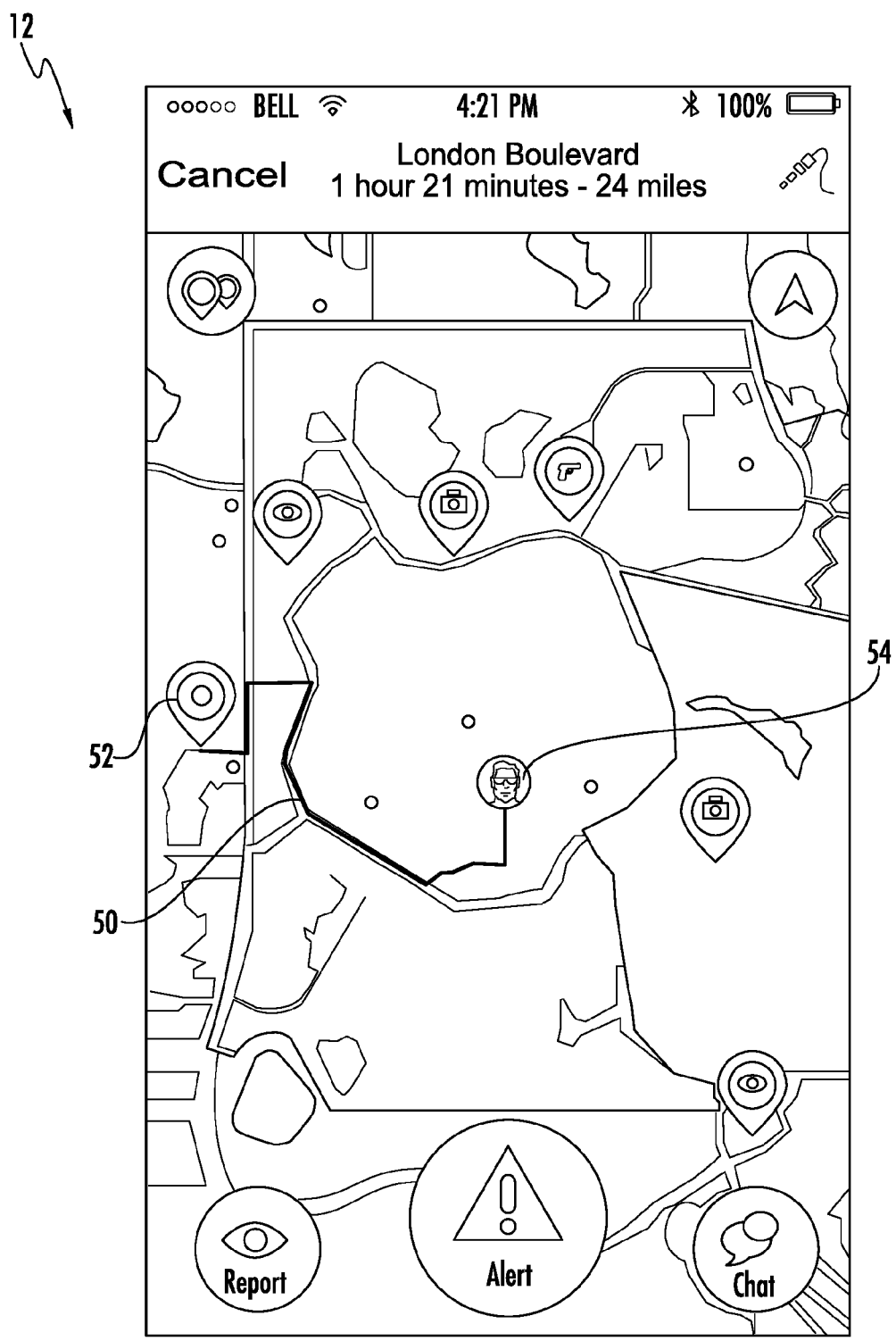
FIG. 5E is a depiction of a personal emergency device displaying a suggested route to a destination.

In one embodiment depicted in FIGS. 5D-5E, the system 10 is operable for determining a route 50 and an estimated travel time to a desired destination 52. Once the destination 52 is entered into the security software by the user, the system 10 calculates a route 50 and an estimated travel time from a current location 54 to the desired destination 52, thereby enabling a user to set an appropriate emergency alert timer duration. If the user does not reach the destination 52 before expiration of the timer, an emergency alert protocol is initiated substantially as described herein. The emergency alert protocol may include a predetermined delay time during which the user may cancel the initiation of an emergency response. If the user arrives at the destination 52 prior to expiration of the timer, the system recognizes their geolocation via location-tracking functionality and the alert timer is automatically cancelled. The system determines whether the user has reached their destination 52 by tracking the location of at least one of the personal emergency device 12 or a peripheral device 36.

In one embodiment, the destination 52 may be selected by engaging a touchscreen on a personal emergency device 12 displaying a map. In another embodiment, the destination 52 may be entered into the personal emergency device 12 by street address, GPS coordinate, or other identifying characteristic. Further, the estimated travel time may vary depending on whether the user selects travel by foot, car, bus, or any other means of transportation, such as by airplane, train, helicopter, boat, and the like. In yet another embodiment, the user may select which of their contacts and/or emergency response personnel shall be notified of at least one of the user beginning to travel to the destination 52, arriving at the destination 52, and failing to arrive at the destination 52.

Figure 12:
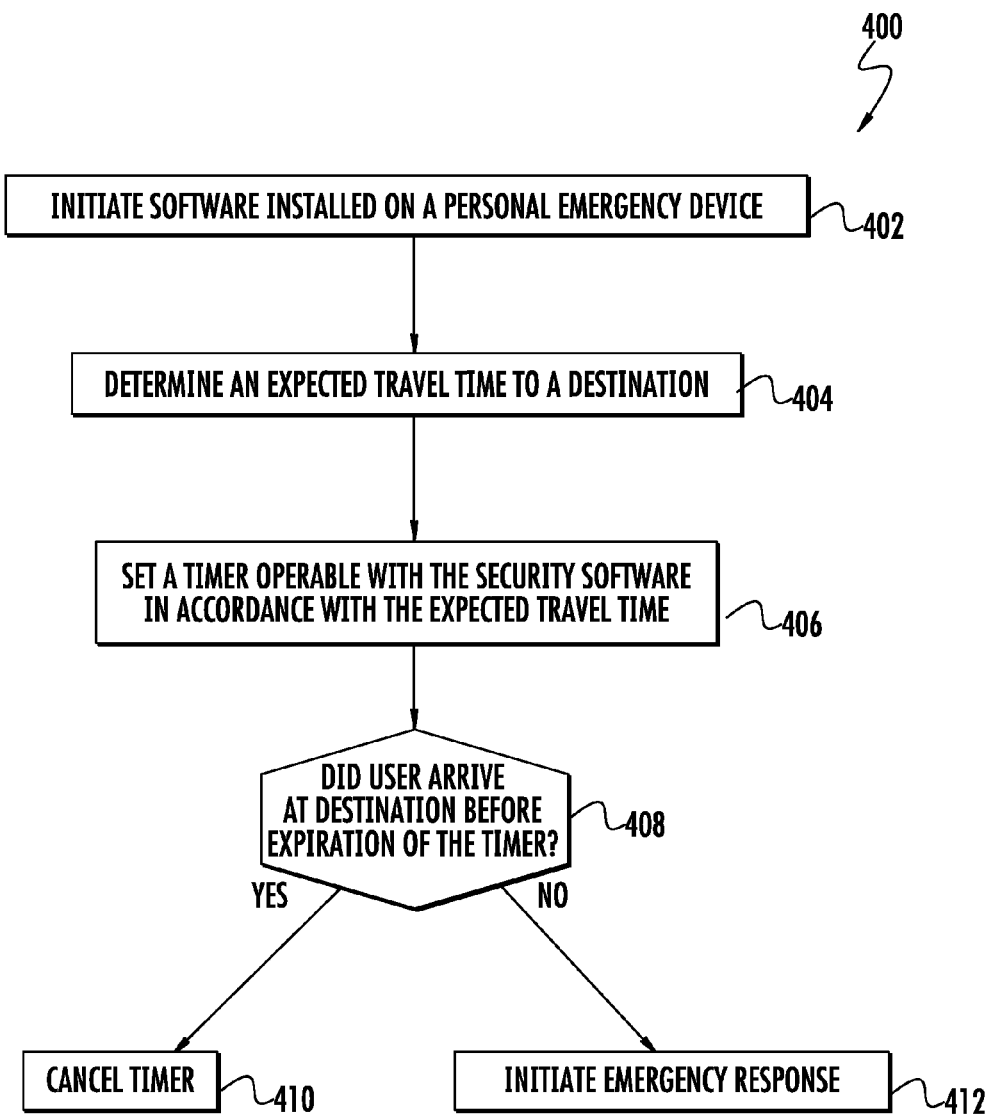
FIG. 12 is a depiction of another method of the present disclosure for initiating a response to an emergency situation.

One exemplary embodiment of the present disclosure depicted in FIG. 12 includes a system and method 400 for initiating an emergency response comprising:
  i. initiating security software installed on a personal emergency device 402;
  ii. determining a travel time to a destination 404; and
  iii. setting a timer 406 operable with the security software in accordance with the travel time, wherein a failure to arrive at the destination before an expiration of the timer initiates an emergency response 412, and wherein arrival at the destination before an expiration of the timer cancels the timer 410.

In one embodiment, the determining a travel time to a destination 52 is performed by the security software. Further, the initiating an emergency response may include a notification of predetermined third parties of the occurrence of an emergency situation. The initiating an emergency response may include transmitting data relating to the destination, the data relating to the destination including a location of the destination. The arrival of the user at the destination may be determined by GPS, assisted GPS (A-GPS), or other relevant technology sufficient for determining, estimating, or transmitting the location of at least one of a user, a personal emergency device 12, or a peripheral device 36.

Figure 5F:
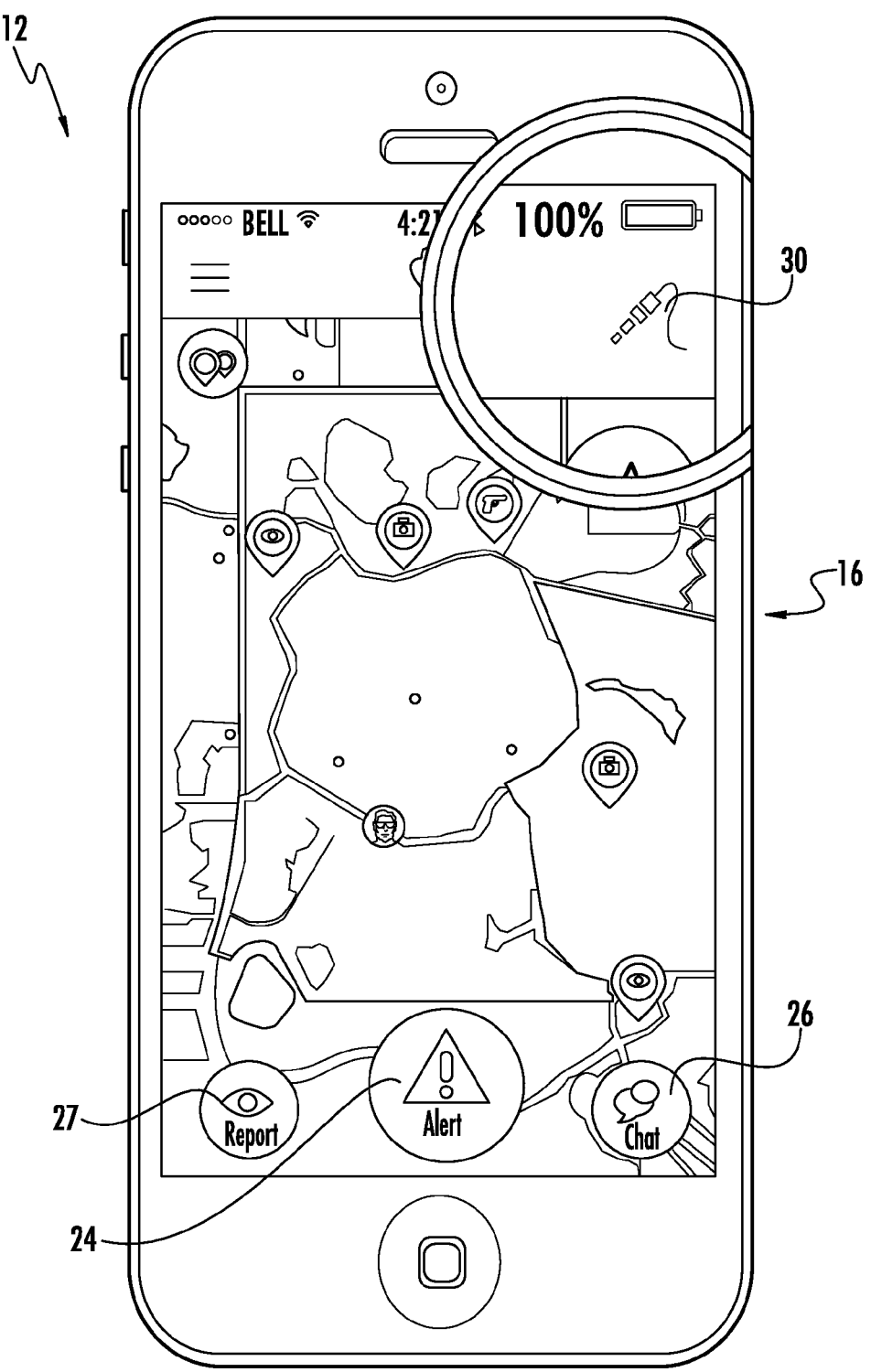
FIG. 5F is a depiction of a personal emergency device displaying an option to engage a peripheral detection service.

With reference initially to FIG. 5C, an embodiment of the system 10 further comprises a peripheral device disconnection emergency signaling feature 30 (i.e. "yank mode") substantially as described in the related provisional patent application 61/823,060, the content of which has been incorporated herein by reference. In one embodiment, the yank mode 30 includes a peripheral device 36 connected to or in communication with the personal emergency device 12. The details of an embodiment of the yank mode 30 are described in greater detail hereinafter. The yank mode 30 may be a separate and distinct mode or may be further combined with any other emergency alert mode, including any one of the emergency 24, timer 26, and chat 28 modes described herein. As depicted in FIG. 5F, one embodiment may include an icon or button that may be pressed or otherwise engaged by a user to activate a peripheral detection service.

In one embodiment, the peripheral device 36 may be a pair of headphones or a safety dongle. The peripheral device 36 may be in wired or wireless communication with the personal emergency device. Embodiments comprising a safety dongle or other comparable peripheral device 36 may further include stored information linking a particular dongle to a particular user and may communicate that information to the personal emergency device to ensure that the dongle, the device, and the user are appropriately paired to one another.

The yank mode 30 enables a user to initiate an emergency alert by pulling and/or disconnecting the peripheral device 36 from the personal emergency device 12 running custom security software 16, thereby terminating communication between the peripheral device 36 and the personal emergency device 12. For example, in embodiments in which the peripheral device 36 is in wired communication with the personal emergency device 12, the termination of communication may involve a physical disconnection between the peripheral 36 and personal emergency devices 12. The physical disconnection may involve a user or other person pulling the peripheral device 36 out of contact with the personal emergency device 12. In embodiments in which the peripheral device 36 is in wireless communication with the personal emergency device 12, the termination of communication may include either moving the peripheral device 36 out of communication range or to a certain predetermined distance from the personal emergency device 12.

In one embodiment, disconnection or a termination of communication of the peripheral device 36 and the personal emergency device 12 instructs at least one of the peripheral device 36 and the personal emergency device 12 to send an emergency alert signal to a dispatch station 18, web service, other personal emergency device 12, or locally to other personal emergency devices 12 in the vicinity of, or a predetermined geographical distance from, the alerting device.

For example, one embodiment includes a system 10 for alerting an emergency situation, the system 10 comprising a first personal emergency device 12 operable by or controlled by a user and configured to signal the presence of an emergency situation. The system may further include at least one second personal emergency device 12 operable by at least one bystander or other user, the at least one second personal emergency device 12 configured to receive data relating to the emergency situation following the signaling of the presence of the emergency situation by the first personal emergency device 12. The system may further comprise a peripheral device 36 in communication with the first personal emergency device 12, wherein a termination of communication between the peripheral device 36 and the first personal emergency device 12 instructs at least one of the first personal emergency device 12 and the peripheral device 36 to transmit data relating to the emergency situation. The data relating to the emergency situation may be transmitted to and a dispatch station 18 over a wireless 23 or partially wireless network, the dispatch station 18 being operable for receiving the data relating to the emergency situation from at least one of the first personal emergency device 12 and the peripheral device 36. The dispatch station 18 may then transmit at least a portion of the data relating to the emergency situation to the at least one bystander present within a predetermined distance from the user, the at least one bystander receiving the data via the at least one second personal emergency device 12.

Figure 10:
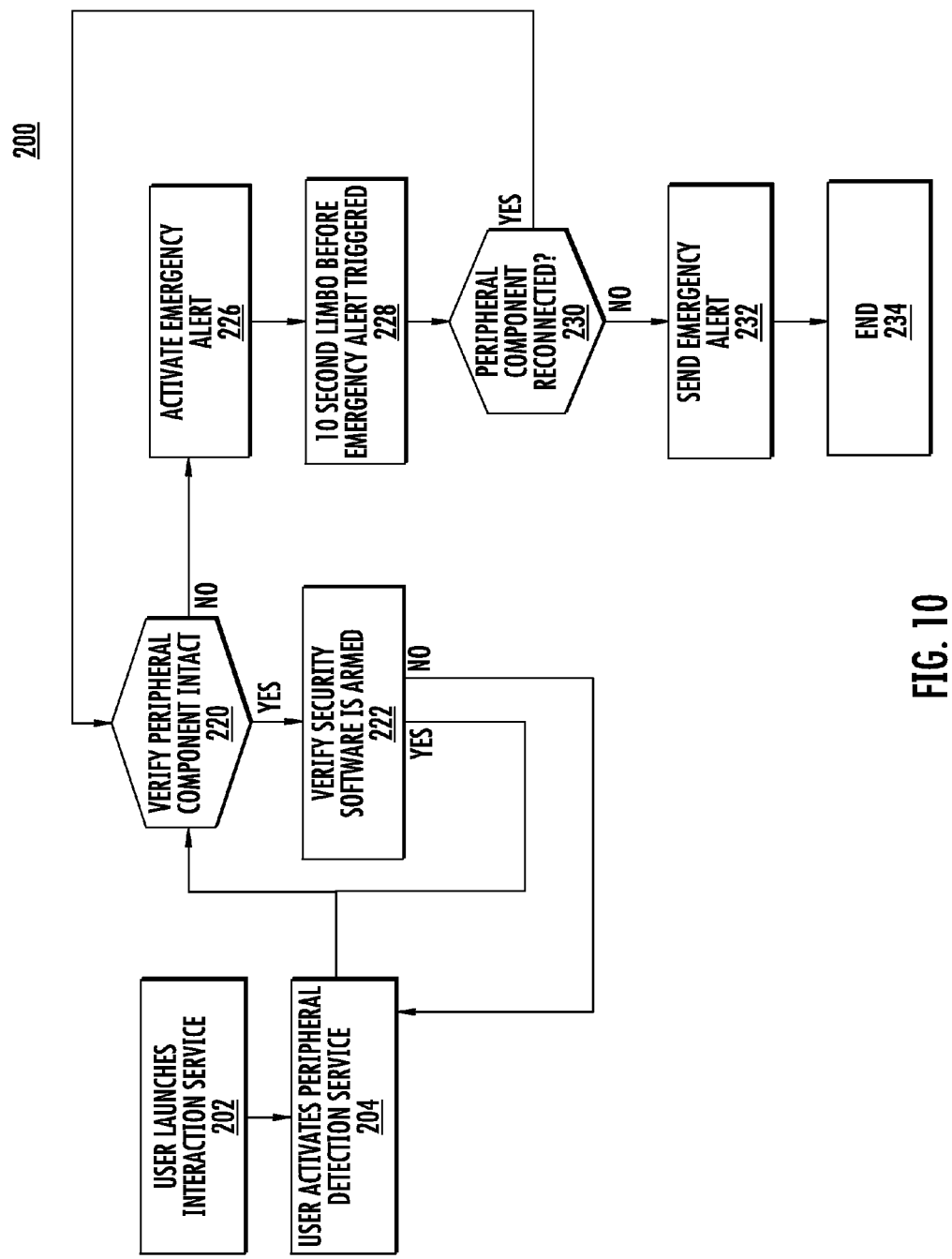
FIG. 10 is a depiction of a peripheral detection service of the present disclosure.

In one embodiment, disconnection of the peripheral device 36 from the personal emergency device 12 (either physically or otherwise) triggers a predetermined countdown time delay as in step 228 (see FIG. 10). If the user does not cancel the alert prior to expiration of the predetermined delay, an emergency alert is transmitted to emergency service personnel 17 and/or other predetermined third parties. If the user cancels the alert prior to expiration of the predetermined time delay, an emergency alert is not transmitted. In one embodiment, the alert may be canceled by either entering a PIN or password or by reestablishing communication between the peripheral device 36 and the personal emergency device 12. In embodiments in which the peripheral device 36 is in wired communication with the personal emergency device 12, the reestablishing of communication may include reestablishing a physical connection between the peripheral 36 and personal emergency 12 devices, such as by inserting a male plug into a female receiver or by joining complementary magnetic means present in both the peripheral 36 and personal emergency 12 devices. In embodiments in which the peripheral device 36 is in wireless communication with the personal emergency device 12, the reestablishing of communication may include returning the peripheral device 36 within a communication range of the personal emergency device 12.

In one embodiment, the emergency alert is accompanied by at least one of an audible sound, for example a siren, and a flashing light. The audible siren may be audible to others in the vicinity and may vary in pitch or intensity. Similarly, the flashing light may be visible to others in the vicinity. The light may be constant or intermittent and may vary in brightness, frequency, or wavelength. The siren or light may further communicate a predetermined message or other information through the use of Morse code or other known communication code.

Figure 6:
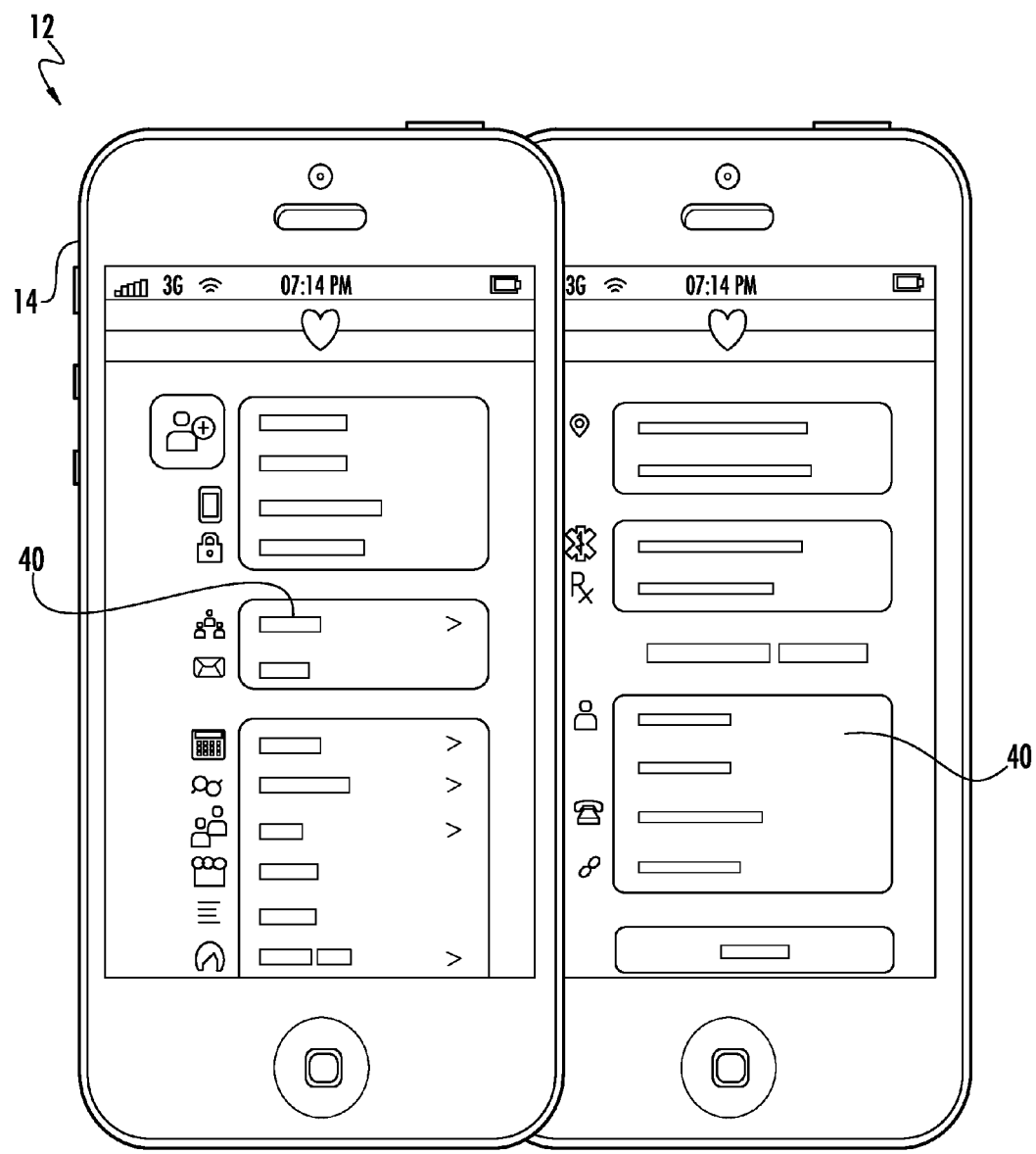
FIG. 6 is a depiction of a personal emergency device displaying a personal profile user interface.

Further, the alert may be transmitted to the dispatch station 18 along with personalized information 40 about the user, which is supplied by the user by inputting into the custom security software 16 upon configuration as depicted in FIG. 6. In one embodiment, the personalized information 40 includes at least one of name, gender, age, race, ethnicity, height, weight, hair color, photograph, allergies, current medications, medical information, health related information, and emergency contact information, including the emergency contact's name and telephone number. The alert may be further accompanied by the transmission of location information to predetermined third parties as determined by GPS capability or other known location tracking technology, such as A-GPS, of the personal emergency device 12.

An embodiment of the system 10 further comprises permitting users to rapidly initiate social engagement surrounding their personal safety, including the ability to initiate a crowd-sourced response to an emergency situation. Users are provided with the opportunity to add a personal network, including their family, friends and loved ones, when setting up their profile in the security software. In the event of an emergency, the user's personal network, such as a safety network, is contacted in addition to the authorities. In one embodiment, a user may input their emergency response capabilities into the system, thereby enabling a crowd-sourced response that targets specific individuals in certain situations. For example, the system may ask a user for details relating to the emergency situation. If the user is experiencing a medical emergency and requires specific medical attention (i.e. CPR, allergic reaction, choking, or other medical emergency), the user may communicate information relating to the medical emergency through the personal emergency device. The system may then alert other users in the vicinity of a user in distress to the nature of the medical emergency. The system may alert all other users in the vicinity, emergency response personnel, and/or only those users with the capability to respond to the specific type of emergency situation as determined by the capabilities entered into the system upon configuration. Individuals with particular capabilities may then respond to the corresponding emergency situation.

Additional features of an embodiment include cross-platform indoor location tracking. After the user signals an alert, the dispatchers will receive the user's real-time GPS location along with their specific floor level and room number. Also envisioned is the ability of the system to provide mass notification of emergency alerts in the event of an incident that threatens the public or a group of individuals. Another exemplary embodiment of the system and method of the present disclosure includes a map-based user interface operable with the personal emergency device that enables a user to view information relating to reported crimes in their vicinity. A user may also report crimes directly through the personal emergency device. For example, the personal emergency device 12 may display an icon or other image that a user may engage, tap, or press to enter a crime reporting mode 27 and initiate a crime reporting protocol, such as that depicted in FIG. 2B.

Figure 7:
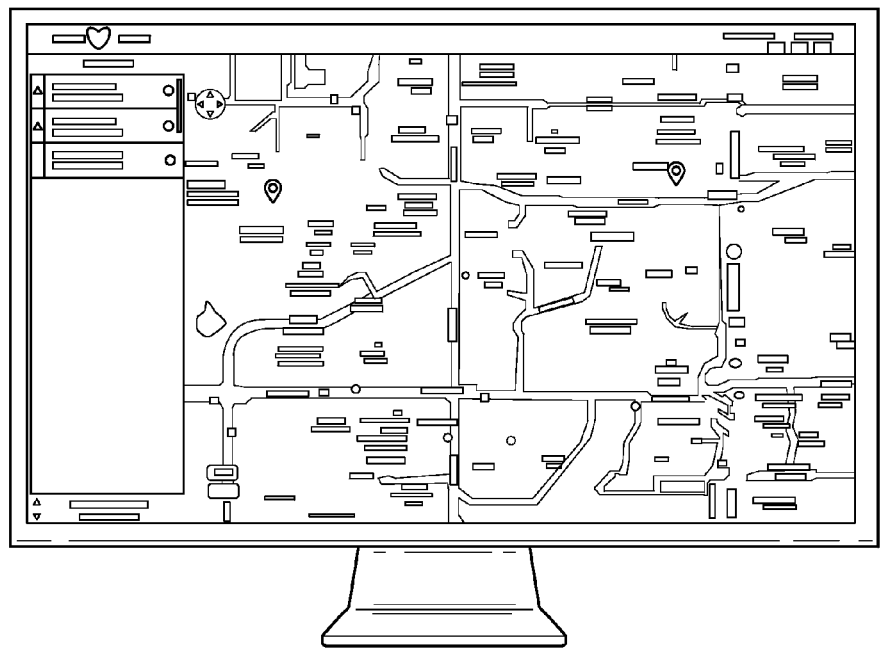
FIG. 7 is a depiction of various configurations of a dispatch station including a computer running custom emergency alert monitoring and reporting software.
Figure 7:
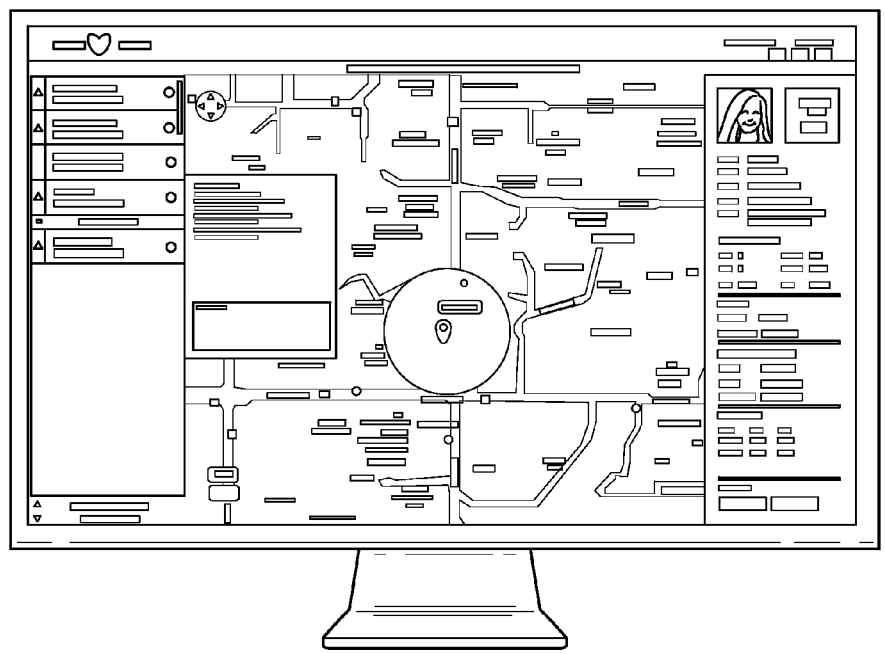

As indicated above, an embodiment of a system 10 further comprises a dispatch station 18 for receiving data relating to an emergency alert and including a computer 20 running custom emergency alert monitoring and reporting software 22. An embodiment of the dispatch station is depicted in FIG. 7. In an alternative embodiment, the system includes a dispatch station 18 including a cloud-based incident response platform that can instantly transmit an individual's real-time GPS location and profile information in the event of an emergency. The dispatch station 18 may be controlled by a dispatcher or may alternatively be partially or completely automated.

In one embodiment, the emergency alert monitoring and reporting software 22 and emergency alert data may be displayed on a computer screen, monitor, or other display device. The emergency alert monitoring and reporting software 22 may be configured to receive emergency alerts and accompanying data from the personal emergency device via a wireless or partially wireless network 23, the accompanying data including the user's location and profile information. The monitoring and reporting software 22 subsequently displays the location of the alert on a graphical map displayed on a monitor, along with user profile information and other desirable information (see FIG. 7).

Figure 8A:
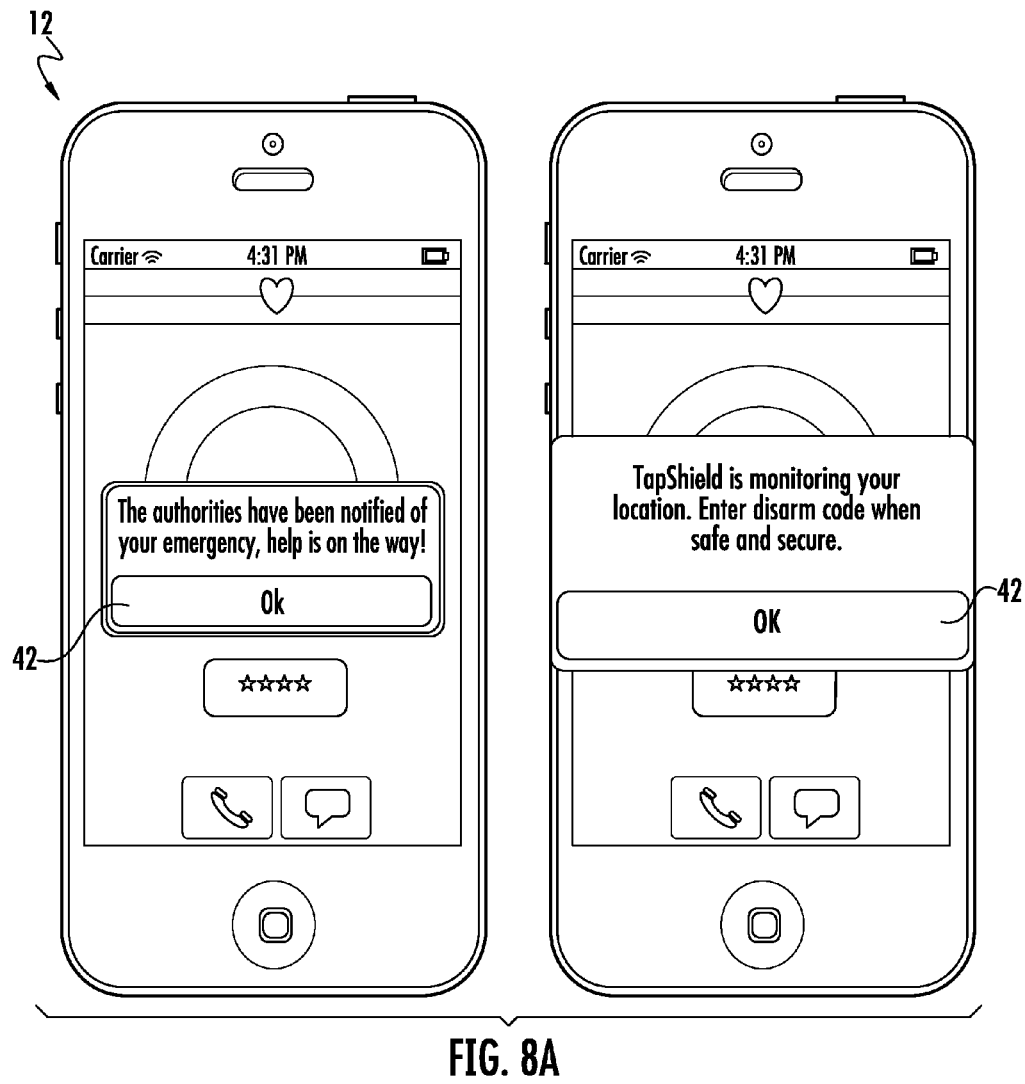
FIG. 8A is a depiction of a personal emergency device confirming receipt of an emergency alert by emergency alert monitoring and reporting software by displaying the message on a screen of a personal emergency device.
Figure 8B:
FIG. 8B is another depiction of a personal emergency device confirming receipt of an emergency alert by emergency alert monitoring and reporting software by displaying the message on a screen of a personal emergency device.

Once an alert is received, the emergency alert monitoring and reporting software 22 may send a signal including at least one verification message 42 to the personal emergency device 12 via the wireless or partially wireless network, which subsequently confirms receipt of the emergency alert by the emergency alert monitoring and reporting software 22 by displaying the message 42 on a screen of the personal emergency device 12 (see FIGS. 8A and 8B). The message 42 may further include instructions for the user to follow or information about the status of inbound emergency response personnel 17.

In one embodiment, the emergency alert monitoring and reporting software 22 includes an incident management platform that helps dispatch personnel monitor, manage and respond to emergency alerts received from personal emergency devices 12, providing real-time user location, user location tracking and profile information, including user identification and user contact information.

During an incident, dispatchers can speak with the user directly through the personal emergency device 12 or engage in a conversation through real-time chat messaging, allowing emergency dispatchers and other emergency response personnel 17 to make educated decisions with more information about the emergency situation. Dispatchers can also send a message via push notification to reach all system users within a predetermined boundary in seconds.

Figure 9C:
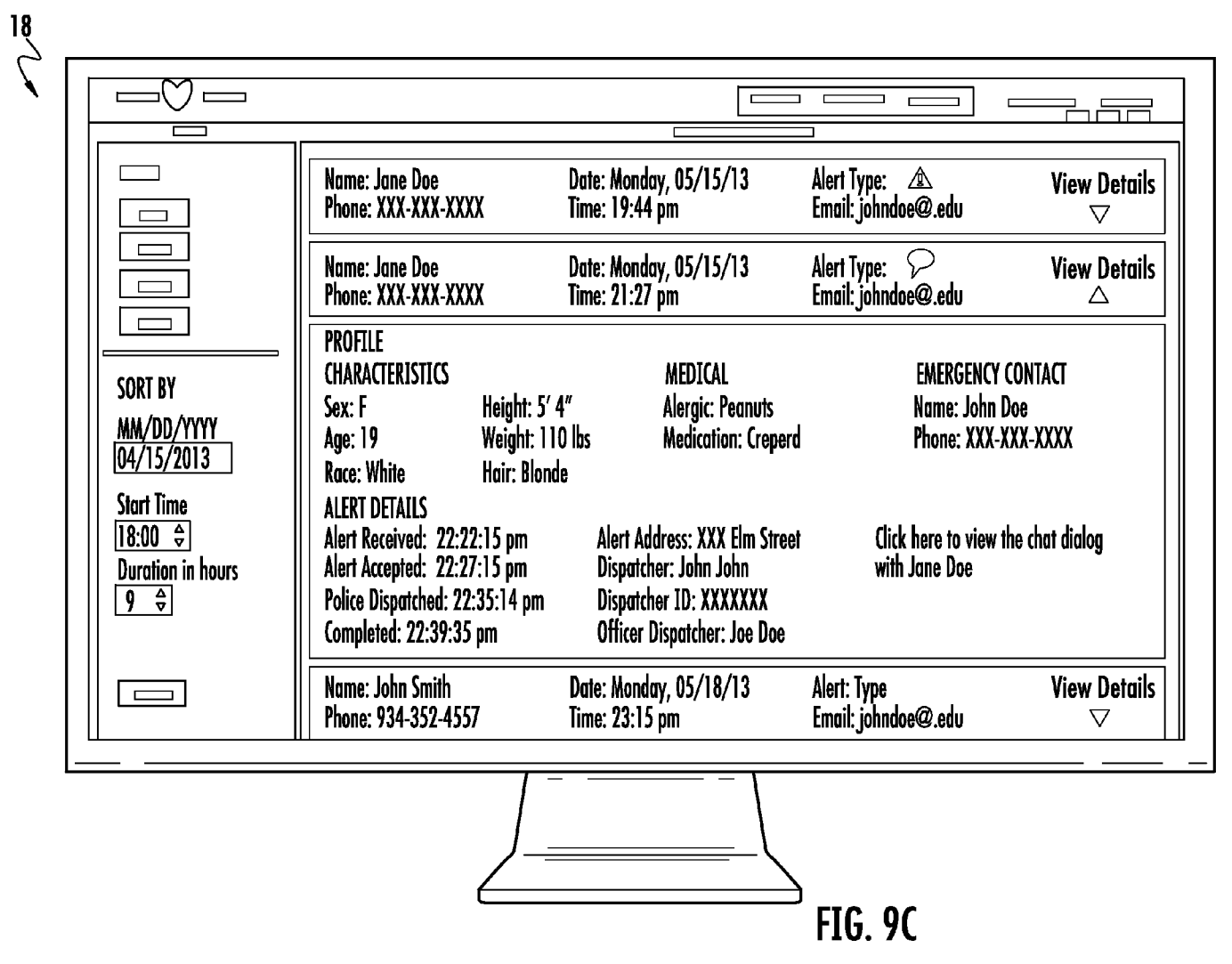

In another embodiment, and with reference to FIGS. 9A-9C, the emergency alert monitoring and reporting software 22 further provides data information regarding interactions users have with the system 10, including providing a determination of areas of concern for a predetermined geographical area, areas of concern being determined by analytics relating to emergency incidents within a geographic area (FIGS. 9A and 9B). The areas of concern may also be displayed by the personal emergency device 12, thereby enabling a user to determine the presence of a high risk area. The data information includes information relating to alert type, frequency, location, gender of the alerting user, as well as personal information about users signaling alerts (FIG.

9C). Other types of emergency incident data are within the scope of the present disclosure.

It is envisioned that a dispatcher receiving an emergency alert from a user will have the capability to communicate information about the emergency, as well as information about the user, including profile information and location, to emergency personnel 17, the emergency personnel including but not limited to police, fire rescue, medical emergency response personnel, FEMA, homeland security, other system users or bystanders within or outside of the immediate or predetermined geographical vicinity or boundary of the emergency situation, and the like.

Figure 11:
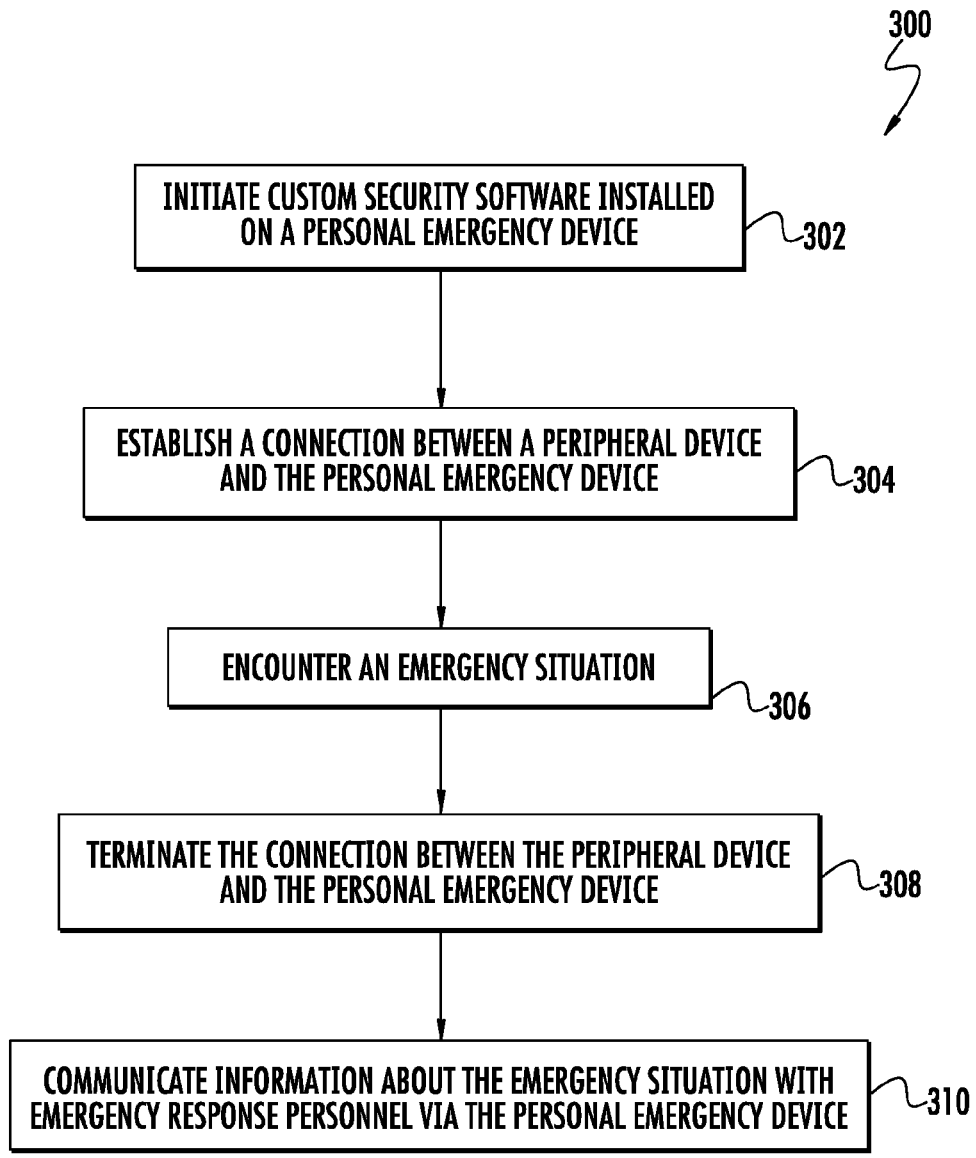
FIG. 11 is a depiction of one method of the present disclosure for initiating a response to an emergency situation.

With reference to FIG. 11, one exemplary method 300 of the present disclosure includes the steps of:
   i. initiating custom security software installed on a personal emergency device 302;
   ii. establishing a connection between a peripheral device and a personal emergency device 304;
   iii. encountering an emergency situation 306;
   iv. terminating the connection between the peripheral device and the personal emergency device 308; and
   v. communicating information about the emergency situation with emergency response personnel via at least one of the personal emergency device and the peripheral device 310.

Peripheral Detection Service

In one exemplary embodiment, and with reference to FIG. 10, the security software 16 as described herein includes and/or controls a peripheral detection service for monitoring the presence or absence of a peripheral device relating to the yank mode 30. The sequence of steps depicted and described herein for monitoring the presence or absence of the peripheral device 36 may be altered in a manner that achieves the same result. Thus, various permutations of the steps described are also considered to be within the scope of the present disclosure.

With continued reference to FIG. 10, one exemplary computer-implemented method 200 for monitoring the presence or absence of a connection between a peripheral device 36 and a personal emergency device 12 includes the following steps:
   i. launching security software 202;
   ii. activating a peripheral detection service 204;
   iii. peripheral detection service verifying peripheral component 36 intact 220;
   iv. if intact, peripheral detection service verifying security software 16 is armed 222;
   v. if armed, peripheral detection service repeatedly verifying peripheral component 36 intact 220 and security software 16 armed 222;
   vi. if peripheral component 36 not intact, the peripheral detection service activating an emergency alert protocol (i.e. beginning a warning mode) 226.

The emergency alert protocol may further include:
   vii. waiting for a predetermined delay period (i.e. starting a timer) before transmitting an emergency alert 228;
   viii. determining whether communication with the peripheral component 36 has been reestablished 230;
   ix. if communication has been reestablished, cancelling the alert and returning to step 220;
   x. if communication has not been reestablished, transmitting the emergency alert 232.

As indicated above, one possible first step includes the user launching security software 202 on their device 12. In one embodiment, a display on at least one of the peripheral device 36 and the personal emergency device 12 can present to a user a menu including selectable icons that can be selected using a touch key controlled cursor or by touching the display with a stylus or human appendage, such as a finger. In another embodiment, the menu keys, can be used to navigate the menu and make a menu selection. In any case, the process can begin in step 202 by a keystroke or touching of the touch screen display to launch the operation of system in accordance with the invention. One icon from the menu can be associated with the method. When launch of the method commences, a welcome screen may be displayed.

A second exemplary step includes arming or activating the peripheral detection service 204 via the security software. In step 220 above, at least one of the peripheral device 36 and the personal emergency device 12 then continually and repeatedly verifies a connection or communication between the selected peripheral device 36 and the personal emergency device 12 at predetermined time intervals. In another exemplary embodiment, the verification of a connection or communication between a personal emergency device and a peripheral device relies on at least one status change notification. The verification process continues for as long as the security software 16 is in the armed state and only activates or initiates an alert and/or an emergency response upon a disconnection of a connection, or a termination of communication, between the peripheral device 36 and the personal emergency device 12.

It will be understood by those of skill in the art that flowcharts and block diagrams herein described may illustrate architecture, algorithms, functionality, and operation of possible implementations of systems, methods and computer program products according to various embodiments. Therefore, it will be understood that each block in the flowchart or block diagram may represent a module, segment, or portion of code, which comprises one or more executable computer program instructions for implementing the specified logical function or functions. Further, some implementations may include the functions in the blocks occurring out of the order as herein presented. By way of non-limiting example, two blocks shown in succession may be executed substantially concurrently, or the blocks may at times be executed in the reverse order, depending upon the functionality involved. It will also be noted that each block of the block diagrams and flowcharts, and combinations of blocks in the block diagram and flowchart illustrations, may be implemented by special purpose hardware-based systems that perform the specified functions or acts, or combinations of special purpose hardware and computer program instructions.

The method and system may be implemented in a computing system, which can include a personal computer, a workstation, a network computer, a hand held computer, or any other computing system. Further, the system may be written as a software program in any appropriate computer language.

The system includes one or more processing devices, which may be any computer processing unit, and could be a single central processing unit, or a number of processing units configured to operate either in sequence or in parallel. The processing device can be configured to execute software processes which implement the steps disclosed herein. The system may also include a memory capable of storing the steps necessary for a processing device to implement the steps disclosed herein. This memory could be in the form of memory resident within the processing device or in the form of standalone memory coupled to the processing unit via a communication path, such as a bus or a network.

Although this disclosure has been described in terms of certain embodiments and generally associated methods, alterations and permutations of these embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A system for monitoring and responding to an emergency situation, the system comprising:
   a communication network, the communication network comprising at least one of a cellular data network and a Wi-Fi network;
   a personal emergency device for permitting a user to signal a presence of an emergency situation, the personal emergency device comprising a GPS-capable mobile device running custom security software, the custom security software storing personal information about the user, the personal information including at least one of a name, gender, age, race, ethnicity, height, weight, photograph, allergies, current medications, hair color, and emergency contact information of the user, the personal emergency device in communication with the communication network for automatically transmitting a location and the personal information of the user upon the signaling of the emergency situation;
   a peripheral device in communication with the personal emergency device, wherein a termination of communication between the peripheral device and the personal emergency device signals the presence of the emergency situation, wherein said peripheral device is at least one of a pair of headphones and a dongle; and
   a dispatch station operable by a dispatcher and in communication with the communication network, the dispatch station comprising a computer with a monitor, the computer running custom emergency alert monitoring and reporting software, the dispatch station operable to receive the location and personal information of the user upon the signaling of the emergency situation and display the location and personal information on the monitor, the dispatch station further operable to permit the dispatcher to notify emergency response personnel within a predetermined geographical proximity of the user of the location and personal information of the user and the emergency situation, wherein the dispatcher can communicate with the user through the custom emergency alert monitoring and reporting software.

2. A system for alerting an emergency situation, the system comprising:
   a first personal emergency device operable by a user and configured to signal a presence of an emergency situation;
   at least one second personal emergency device operable by at least one bystander, the at least one second personal emergency device configured to receive data relating to the emergency situation;
   a peripheral device in communication with the first personal emergency device, wherein a termination of communication between the peripheral device and the first personal emergency device instructs at least one of the first personal emergency device and the peripheral device to transmit data relating to the emergency situation, wherein said peripheral device is at least one of a pair of headphones and a dongle; and
   a dispatch station operable for receiving the data relating to the emergency situation from at least one of the first personal emergency device and the peripheral device and transmitting at least a portion of the data to the at least one bystander present within a predetermined distance from the user, the at least one bystander receiving the data via the at least one second personal emergency device.

3. The system as described in claim 2 wherein the peripheral device is in wired communication with the first personal emergency device, and wherein the termination of communication is achieved by pulling the peripheral device to provide an alert.

4. The system as described in claim 2 wherein the peripheral device is in wireless communication with the first peripheral device.

5. The system as described in claim 2 wherein the data relating to the emergency situation includes a location of at least one of the first personal emergency device and the peripheral device.

6. The system as described in claim 2 wherein the data relating to the emergency situation includes at least one of a name, gender, age, race, ethnicity, height, weight, photograph, allergies, current medications, medical information, health information, hair color, and emergency contact information of the user.

7. The system as described in claim 2, the system operable to permit two-way communication between the dispatch station and the user.

8. The system as described in claim 7, the system further operable to permit two-way communication between the user and at least one of a predetermined group of individuals.

9. The system as described in claim 7 wherein the two-way communication includes at least one of text, sound, and image.

10. The system as described in claim 2, wherein a reestablishing of communication between the first personal emergency device and the peripheral device instructs at least one of the first personal emergency device and the peripheral device to transmit a signal that the emergency situation has ended.

11. The system as described in claim 2, the first personal emergency device further configured to permit the user to establish a time after which the data relating to the emergency situation will automatically be transmitted to the dispatch station.

12. A system for initiating a response to an emergency situation, the system comprising:
    a personal emergency device operable for permitting a user to signal a presence of an emergency situation, a peripheral device in communication with the personal emergency device, wherein a termination of communication between the peripheral device and the personal emergency device instructs the personal emergency device to signal the presence of the emergency situation, wherein said peripheral device is at least one of a pair of headphones and a dongle; the personal emergency device configured to automatically transmit a location of the user upon the signaling of the emergency situation; and
    a dispatch station operable to receive the location of the user and notify emergency response personnel within a predetermined geographical proximity of the user of the location of the user.

13. The system as described in claim 12, the personal emergency device comprising a GPS-capable mobile device running security software.

14. The system as described in claim 13, wherein the security software stores personal information about the user and further transmits the personal information upon the signaling of the emergency situation.

15. The system as described in claim 14, wherein the personal information includes at least one of a name, gender, age, race, ethnicity, height, weight, photograph, allergies, current medications, hair color, and emergency contact information of the user.

16. The system as described in claim 12, the dispatch station comprising a computer running custom emergency alert monitoring and reporting software.

17. The system as described in claim 12, further comprising a GPS-capable peripheral device in communication with the personal emergency device, the GPS-capable peripheral device capable of automatically transmitting a location of the user upon the signaling of the emergency situation, wherein a termination of communication between the peripheral device and the personal emergency device instructs the GPS-capable peripheral device to signal the presence of the emergency situation.

18. The system as described in claim 12, wherein the personal emergency device is further operable to permit two-way communication between the user and at least one of the dispatch station and predetermined third parties.

19. The system as described in claim 12, wherein the emergency response personnel comprises other users of the system.

20. A system for signaling the presence of an emergency situation, the system comprising:
- a smart dongle in control of a user and operable for signaling the presence of an emergency situation;
- a personal emergency device in communication with the smart dongle, wherein a termination of communication between the smart dongle and the personal emergency device instructs at least one of the smart dongle and the personal emergency device to signal an alert; and a dispatch station operable to receive said alert.

21. The system as described in claim 20, wherein at least one of the dongle and the personal emergency device is operable for being tracked by location.

22. The system as described in claim 21, wherein the tracking is via at least one of GPS and A-GPS.

23. The system as described in claim 21, wherein the alert includes a transmission of a location of at least one of the smart dongle and the personal emergency device.

24. The system as described in claim 23, wherein the alert further includes at least one of a name, gender, age, race, ethnicity, height, weight, photograph, allergies, current medications, medical information, health information, hair color, and emergency contact information of the user.

25. The system as described in claim 20, wherein the system is further operable for verifying a proper pairing of the user, the dongle, and the personal safety device.

26. A method for signaling the presence of an emergency situation, the method comprising:
- initiating custom security software installed on a personal emergency device;
- establishing a connection between a peripheral device and the personal emergency device, wherein the personal emergency device repeatedly confirms the connection between the peripheral device and the personal safety device;
- encountering an emergency situation;
- terminating the connection between the peripheral device and the personal emergency device, wherein the terminating the connection instructs the personal emergency device to signal the presence of the emergency situation, wherein said peripheral device is at least one of a pair of headphones and a dongle; and
- communicating information about the emergency situation with emergency response personnel via a dispatch station and via the personal emergency device.

* * * * *